(12) United States Patent
Yamada

(10) Patent No.: US 8,169,643 B2
(45) Date of Patent: May 1, 2012

(54) COMMUNICATION SYSTEM INCLUDING PRINTER AND USER TERMINALS FOR BI-DIRECTIONAL COMMUNICATIONS

(75) Inventor: Takafumi Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 966 days.

(21) Appl. No.: 11/948,592

(22) Filed: Nov. 30, 2007

(65) Prior Publication Data
US 2008/0130044 A1   Jun. 5, 2008

(30) Foreign Application Priority Data

Nov. 30, 2006   (JP) ................................. 2006-324540

(51) Int. Cl.
*G06F 3/12* (2006.01)
(52) U.S. Cl. ...................... 358/1.15; 358/1.1; 358/3.28
(58) Field of Classification Search .................. 358/1.1, 358/1.9, 3.28, 3.31, 400, 401, 296, 1.15
See application file for complete search history.

(56) References Cited

U.S. PATENT DOCUMENTS

| 6,809,841 B2 * | 10/2004 | Brewster ...................... 358/3.31 |
| 2004/0139326 A1 | 7/2004 | Ootsuka et al. |
| 2004/0168130 A1 | 8/2004 | Ishizaki |

FOREIGN PATENT DOCUMENTS

| JP | 6-284144 A | 10/1994 |
| JP | 2003-246113 A | 9/2003 |
| JP | 2003-330683 A | 11/2003 |
| JP | 2004-054322 A | 2/2004 |
| JP | 2004-213128 A | 7/2004 |
| JP | 2004-260273 | 9/2004 |
| JP | 2004-326394 A | 11/2004 |
| JP | 2005-205768 A | 8/2005 |
| JP | 2005-297363 | 10/2005 |
| JP | 2006-088530 A | 4/2006 |
| JP | 2006-312255 A | 11/2006 |

OTHER PUBLICATIONS

JP Office Action dtd Nov. 11, 2008, JP Appln. 2006-324540.

* cited by examiner

*Primary Examiner* — Thomas D Lee
(74) *Attorney, Agent, or Firm* — Banner & Witcoff, Ltd.

(57) ABSTRACT

A communication system includes: at least one user terminal; a printer; a storage device; a registering unit; and a list transmitting unit. The printer includes a print controlling unit that prints an image on a recording sheet based on target print data received from a user terminal, and that prints on the same recording sheet a mark set by the user terminal according to a mark configuration parameter. The registering unit records in the storage device a combination of a mark configuration parameter and identification data that is received from one of the at least one user terminal, the mark configuration parameter indicating configuration of a mark that has been set at the subject user terminal, the identification data identifying one user that has set the mark. The list transmitting unit transmits to each user terminal data of a mark list that lists up at least one combination of the mark configuration parameter and the identification data that has been stored in the storage device.

23 Claims, 13 Drawing Sheets

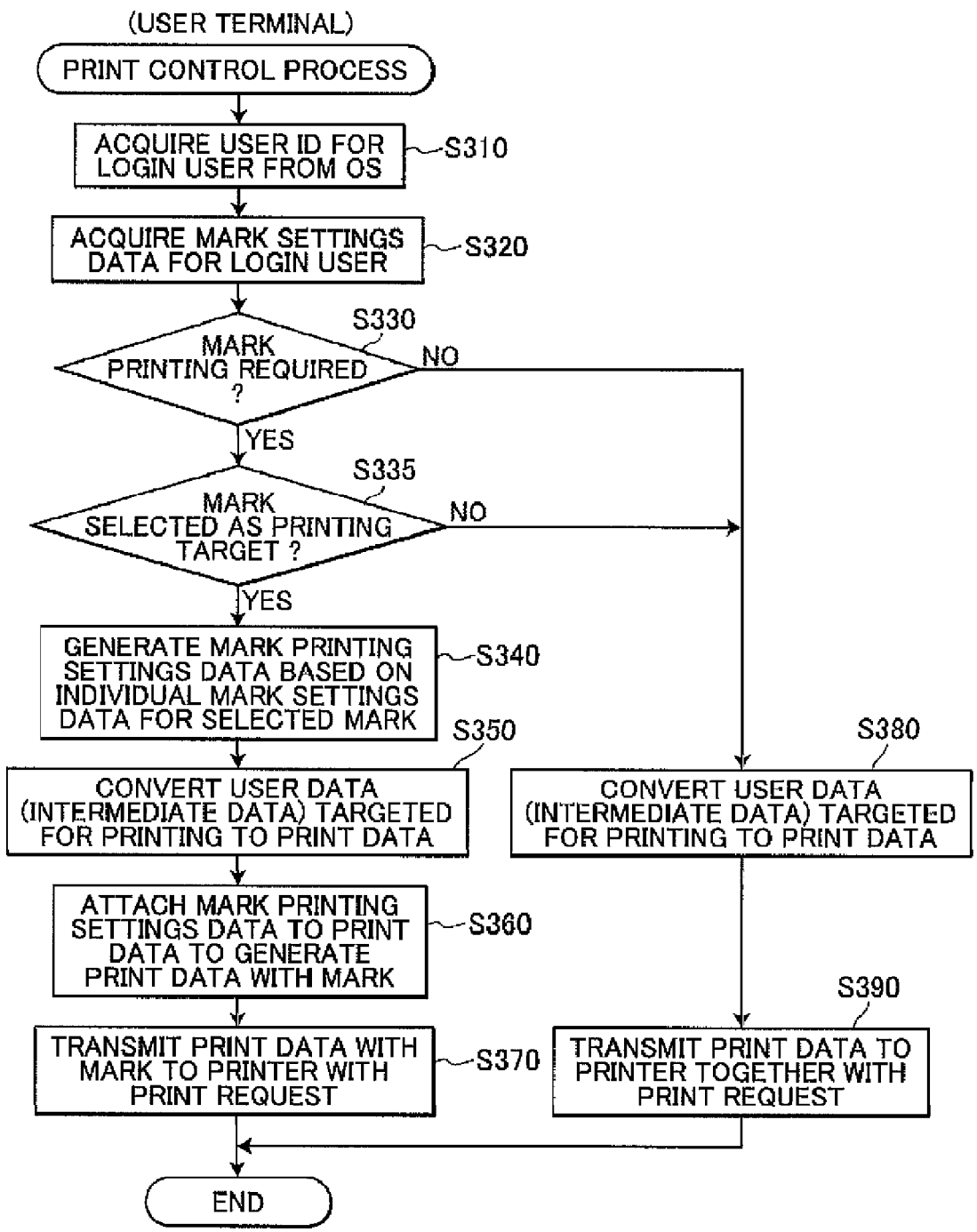

FIG.7

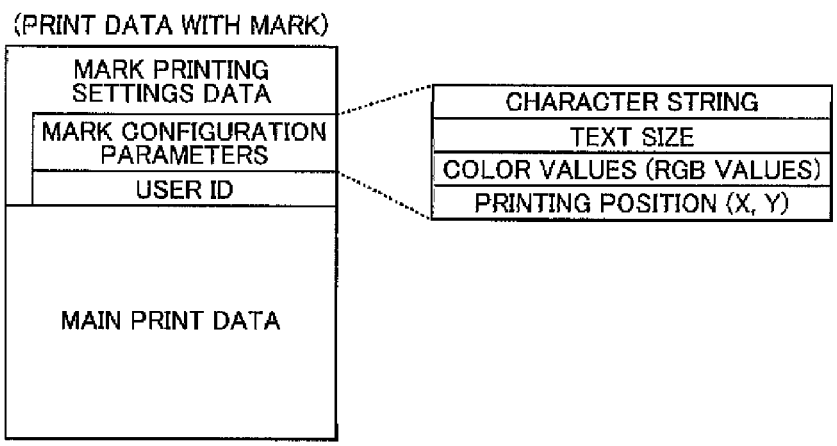

(PRINT DATA WITH MARK)

| MARK PRINTING SETTINGS DATA |
| MARK CONFIGURATION PARAMETERS |
| USER ID |
| MAIN PRINT DATA |

| CHARACTER STRING |
| TEXT SIZE |
| COLOR VALUES (RGB VALUES) |
| PRINTING POSITION (X, Y) |

FIG.9

MARK-DATA

| | USER | TEXT | SIZE | COLOR (RGB) | PRINTING POSITION | PRINTING TIME |
|---|---|---|---|---|---|---|
| 1 | User3 | Sato | 10 | (0,0,0) | x=0, y=0 | 2006/09/25 13:00 |
| 2 | User1 | Sample | 8 | (255,0,0) | x=10, y=0 | 2006/09/25 13:10 |
| 3 | User2 | Mark1 | 12 | (0,255,0) | x=5, y=5 | 2006/09/25 13:25 |
| 4 | User4 | 《Document》 | 10 | (0,0,255) | x=10, y=0 | 2006/09/25 14:11 |
| 5 | User5 | Yamada | 10 | (0,0,0) | x=0, y=0 | 2006/09/25 14:43 |
| 6 | User6 | Kato | 8 | (255,0,255) | x=100, y=0 | 2006/09/25 15:01 |
| 7 | User2 | Mark1 | 12 | (0,255,0) | x=5, y=5 | 2006/09/25 15:48 |
| 8 | User6 | Kato | 8 | (255,0,255) | x=100, y=0 | 2006/09/25 16:21 |
| 9 | User4 | 《Document》 | 10 | (0,0,255) | x=10, y=0 | 2006/09/25 16:44 |
| 10 | User6 | Kato | 8 | (255,0,255) | x=100, y=0 | 2006/09/25 17:19 |
| 11 | User5 | Yamada | 10 | (0,0,0) | x=0, y=0 | 2006/09/25 17:50 |

CLOSE    ACQUIRE MARK DATA (HISTORY FILE)

| USER | TEXT | SIZE | COLOR (RGB) | PRINTING POSITION | PRINTING TIME |
|---|---|---|---|---|---|
| User3 | Sato | 10 | (0,0,0) | x=0, y=0 | 2006/09/25 13:00 |
| User1 | Sample | 8 | (255,0,0) | x=10, y=0 | 2006/09/25 13:10 |
| User2 | Mark1 | 12 | (0,255,0) | x=5, y=5 | 2006/09/25 13:25 |
| User4 | 《Document》 | 10 | (0,0,255) | x=10, y=0 | 2006/09/25 14:11 |
| User5 | Yamada | 10 | (0,0,0) | x=0, y=0 | 2006/09/25 14:43 |
| User6 | Kato | 8 | (255,0,255) | x=100, y=0 | 2006/09/25 15:01 |
| User2 | Mark1 | 12 | (0,255,0) | x=5, y=5 | 2006/09/25 15:48 |
| User6 | Kato | 8 | (255,0,255) | x=100, y=0 | 2006/09/25 16:21 |
| User4 | 《Document》 | 10 | (0,0,255) | x=10, y=0 | 2006/09/25 16:44 |
| User6 | Kato | 8 | (255,0,255) | x=100, y=0 | 2006/09/25 17:19 |
| User5 | Yamada | 10 | (0,0,0) | x=0, y=0 | 2006/09/25 17:50 |

COMMUNICATION SYSTEM INCLUDING PRINTER AND USER TERMINALS FOR BI-DIRECTIONAL COMMUNICATIONS

CROSS REFERENCE TO RELATED APPLICATION

This application claims priority from Japanese Patent Application No. 2006-324540 filed Nov. 30, 2006. The entire content of this priority application is incorporated herein by reference.

TECHNICAL FIELD

The present invention relates to a communication system including a printer and user terminals capable of performing bi-directional communications via a network.

BACKGROUND

In recent years, communication systems having a plurality of user terminals connected to and capable of sharing a printer via a network have become widespread in use. With such a communication system, each user terminal can transmit print data to the printer, while the printer prints images on paper based on the data in the order received and outputs the printed material to a discharge tray of the printer. Consequently, the printer outputs the printed results (paper) based on print data received from different user terminals to the discharge tray of the printer, mixing the printed results for different users on the same discharge tray.

As a result, each user must look through the stack of paper on the discharge tray to extract the printed results outputted according to the user's command. However, when at a rush at work, a user may mistakenly take printed results outputted by another user.

When a user mistakenly takes the wrong printout from the discharge tray, the user that original issued a command to print the job cannot obtain this printed material from the discharge tray and must repeat the printing operation from the user's own terminal, resulting in a great inconvenience to the user.

U.S. Patent Application Publication No. 2004/168130A1 proposes a technology for printing a mark capable of identifying the user on the back surface of the paper. Since such a mark easily identifies the user, a different user is less likely to take the wrong printed results from the discharge tray.

SUMMARY

However, when each user of a plurality of user terminals sets their own marks individually, it is possible that different users could set the same or similar marks to be printed on the paper. If the same or similar marks are adopted for different users, there is still a chance that a user might mistakenly retrieve printed material for another user from the discharge tray, even when marks are printed on the paper.

In view of the foregoing, it is an object of the present invention to provide a technology for reducing the possibility of different users setting the same or similar marks.

In order to attain the above and other objects, the present invention provides a communication system including: at least one user terminal; a printer; a storage device; a registering unit; and a list transmitting unit. The at least one user terminal is connected to a network. The printer is capable of performing bi-directional communications with each user terminal via the network. The printer includes a print controlling unit that prints an image on a recording sheet based on target print data received from a user terminal, and that prints on the same recording sheet a mark set by the user terminal, from which the target print data has been received, according to a mark configuration parameter indicating configuration of the mark. The registering unit records in the storage device a combination of a mark configuration parameter and identification data that is received from one of the at least one user terminal, the mark configuration parameter indicating configuration of a mark that has been set at the subject user terminal, the identification data identifying one user that has set the mark. The list transmitting unit transmits to each user terminal data of a mark list that lists up at least one combination of the mark configuration parameter and the identification data that has been stored in the storage device. Each user terminal includes: an inputting unit; a displaying unit; a parameter setting unit; a data transmitting unit; and a user data display controlling unit. The inputting unit receives user operations. The displaying unit displays data. The parameter setting unit sets, according to input operations received via the inputting unit, a mark configuration parameter indicating configuration of a mark desired to be added to an image desired to be printed by the target print data. The data transmitting unit transmits a combination of the mark configuration parameter and identification data of a user that has set the mark configuration parameter to the printer via the network. The data transmitting unit transmits target print data to the printer via the network when a printing command is received via the inputting unit. The user data display controlling unit displays on the displaying unit the mark list based on the data of the mark list received via the network.

According to another aspect, the present invention provides a printer including: a communication unit; a print controlling unit; a storage device; a registering unit; and a list transmitting unit. The communication unit is connected to at least one user terminal via a network and is capable of performing bi-directional communications with the at least one user terminal via the network. The print controlling unit prints an image on a recording sheet based on target print data that has been received from a user terminal, and prints on the same recording sheet a mark set by the user terminal, from which the target print data has been received, according to a mark configuration parameter indicating configuration of the mark. The registering unit records in the storage device a combination of a mark configuration parameter and identification data that is received from one of the at least one user terminal, the mark configuration parameter indicating configuration of a mark that has been set at the subject user terminal, the identification data identifying one user that has set the mark. The list transmitting unit transmits to each user terminal data of a mark list that lists up at least one combination of the mark configuration parameter and the identification data that has been stored in the storage device.

According to another aspect, the present invention provides a user terminal including: a communication unit; an inputting unit; a displaying unit; a parameter setting unit; a data transmitting unit; and a user data display controlling unit. The communication unit is connected to a printer via a network and is capable of performing bi-directional communications with the printer via the network. The inputting unit receives user operations. The displaying unit displays data. The parameter setting unit sets, according to input operations received via the inputting unit, a mark configuration parameter indicating configuration of a mark desired to be added to an image desired to be printed by target print data. The data transmitting unit transmits a combination of the mark configuration parameter and identification data of a user that has set the mark configuration parameter to the printer via the network, thereby allowing the printer to store the combination of the mark configuration parameter and identification data. The data transmitting unit transmits the target print data to the printer via the network when a printing command is received via the inputting unit. The user data display controlling unit displays on the displaying unit a mark list based on data of the mark list that has been stored in the printer and that has been received from the printer via the network, the mark list listing up at least one combination of the mark configuration parameter and the identification data, each combination including a mark configuration parameter indicating configuration of a mark and identification data identifying a user that has set the mark.

According to another aspect, the present invention provides a computer readable medium storing a set of program instructions executable on a data processing device, the data processing device being connected to at least one user terminal via a network and being capable of performing bi-directional communications with the at least one user terminal via the network, the processing device including a print controlling unit that prints an image on a recording sheet based on target print data that has been received from a user terminal, and that prints on the same recording sheet a mark set by the user terminal, from which the target print data has been received, according to a mark configuration parameter indicating configuration of the mark, the instructions including: registering in a storage device provided in the data processing device a combination of a mark configuration parameter and identification data that is received from one of the at least one user terminal, the mark configuration parameter indicating configuration of a mark that has been set at the subject user terminal, the identification data identifying one user that has set the mark; and transmitting to each user terminal data of a mark list that lists up at least one combination of the mark configuration parameter and the identification data that has been stored in the storage device.

According to another aspect, the present invention provides a computer readable medium storing a set of program instructions executable on a data processing device provided on a user terminal, the user terminal being connected to a printer via a network and being capable of performing bi-directional communications with the printer via the network, the data processing device having an inputting unit that receives user operations and a displaying unit that displays data, the instructions including: setting, according to input operations received via the inputting unit, a mark configuration parameter indicating configuration of a mark desired to be added to an image desired to be printed by target print data; transmitting a combination of the mark configuration parameter and identification data of a user that has set the mark configuration parameter to the printer via the network, thereby allowing the printer to store the combination of the mark configuration parameter and identification data therein; transmitting the target print data to the printer via the network when a printing command is received via the inputting unit; and controlling the displaying unit to display a mark list based on data of the mark list that has been stored in the printer and that has been received from the printer via the network, the mark list listing up at least one combination of the mark configuration parameter and the identification data, each combination including a mark configuration parameter indicating configuration of a mark and identification data identifying a user that has set the mark.

BRIEF DESCRIPTION OF THE DRAWINGS

In the drawings:

FIG. 5(*b*) is an explanatory diagram showing the structure of a mark settings dialog box;

FIG. 6 is a flowchart illustrating steps in a print control process executed by the CPU in the user terminal;

FIG. 7 is an explanatory diagram showing the structure of print data including a mark;

FIG. 9 is an explanatory diagram showing the structure of a mark data dialog box;

DETAILED DESCRIPTION

Figure 1:
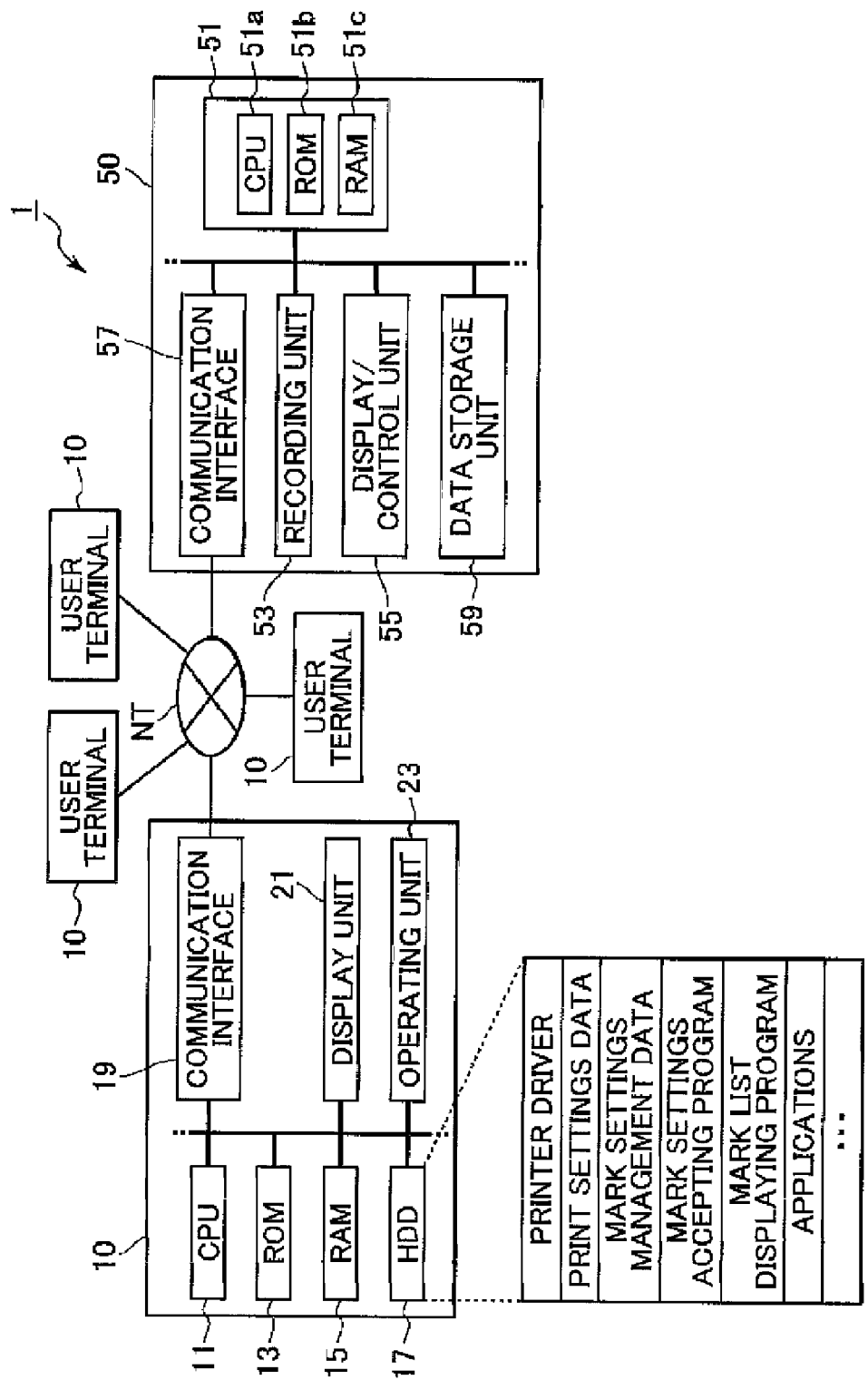
FIG. 1 is a block diagram showing the structure of a communication system according to an embodiment of the present invention.

A communication system according to an embodiment of the invention will be described while referring to the accompanying drawings wherein like parts and components are designated by the same reference numerals to avoid duplicating description.

FIG. 1 is a block diagram showing the structure of a communication system 1 according to the embodiment of the present invention. The communication system 1 includes a plurality of user terminals 10, a printer 50, and a network NT. The user terminals 10 are connected to and capable of performing bi-directional communications with the printer 50 via the network NT.

Each user terminal 10 in the communication system 1 has a function for converting user data generated in a variety of application programs into print data of the page description language (PDL) format and for transmitting this print data to the printer 50 via the network NT.

A printer driver is also installed in each user terminal 10. The printer driver has a function for attaching to the print data mark printing settings data indicating the method of printing a mark set by the user and for transmitting this data to the printer 50 (see FIG. 2). Upon receiving this data from the user terminal 10, the printer 50 converts the print data to bitmap data and lays out the mark set by the user in the bitmap data.

More specifically, the printer 50 generates bitmap data representing the mark according to descriptions in the mark printing settings data, and combines this bitmap data with bitmap data corresponding to the print data to generate bitmap data for the print data with the mark laid out therein. Hence, by printing an image on paper based on this bitmap data, the printer 50 prints the mark on the paper.

The printer 50 is configured to print a mark on paper according to a command from the user terminal 10 so that the user of the user terminal 10 can distinguish paper printed out according to the user's own print command from paper printed out by another user.

Since a plurality of the user terminals 10 share the printer 50 via the network NT, paper printed out according to print commands from each of the plurality of users is accumulated in the same discharge tray (not shown) of the printer 50. Therefore, the printer 50 prints a mark on the paper so that each user can easily distinguish paper printed out according to the user's print command.

In order to facilitate users in distinguishing their printed output with marks, the communication system 1 prevents a plurality of users from adopting the same or similar marks. Next, the structure of the communication system 1 will be described in detail while focusing on this point.

As shown in FIG. 1, the user terminal 10 includes a CPU 11 for executing various programs, a ROM 13 for storing a boot program and the like, a RAM 15 used as a work area when the CPU 11 executes programs, a hard disk drive (HDD) 17 for storing data and the various programs executed by the CPU 11, a communication interface 19 for implementing bi-directional communications with another device on the network NT, a display unit 21 configured of a liquid crystal display or the like for displaying information, and an operating unit 23 configured of a keyboard, pointing device, and the like for accepting user operations.

The user terminal 10 runs according to an operating system (OS), such as Windows (registered trademark), capable of setting a plurality of login users and executes various application programs under this OS.

As described above, the user terminal 10 has a function for instructing the printer 50 to print an image based on user data created with one of the various application programs, such as word-processing software and spreadsheet software. The CPU 11 implements this function by executing a printer driver stored on the HDD 17.

Figure 2:
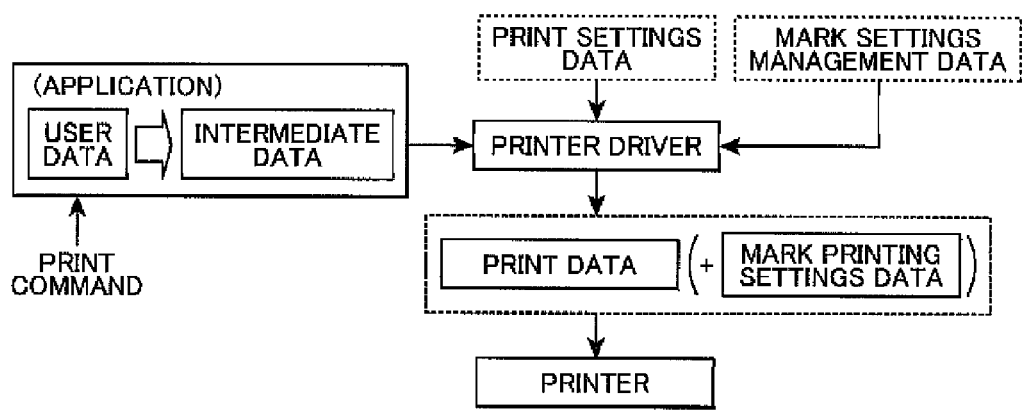
FIG. 2 is an explanatory diagram illustrating steps in a process performed by a user terminal in response to a print command.

FIG. 2 conceptually illustrates steps in the process performed on the user terminal 10 when the user issues a command to print user data through a GUI window displayed by the application program on the display unit 21.

As shown in FIG. 2, when the user of the user terminal 10 executes a print command through an operation in the window of an application program while user data is open in this application program, the application program works in cooperation with the OS to convert the user data opened in the program to intermediate data that can be interpreted by the printer driver.

Next, the printer driver converts this intermediate data to print data conforming to printing conditions indicated in print settings data. The print settings data is recorded on the HDD 17 and specify such printing conditions as the paper size, page layout, and paper orientation. The print data generated by the printer driver in the present embodiment describes image data to be printed in PDL, which language can be interpreted by the printer 50.

When executing this process, the printer driver transmits this data to the printer 50 via the communication interface 19. At this time, the printer 50 begins printing an image on paper based on this print data.

As needed, the printer driver in the user terminal 10 also generates mark printing settings data based on mark settings management data stored on the HDD 17. The mark printing settings data instructs the printer 50 to print a mark set by the login user. The printer driver has a function to transmit the mark printing settings data to the printer 50 together with the print data.

Figure 3:
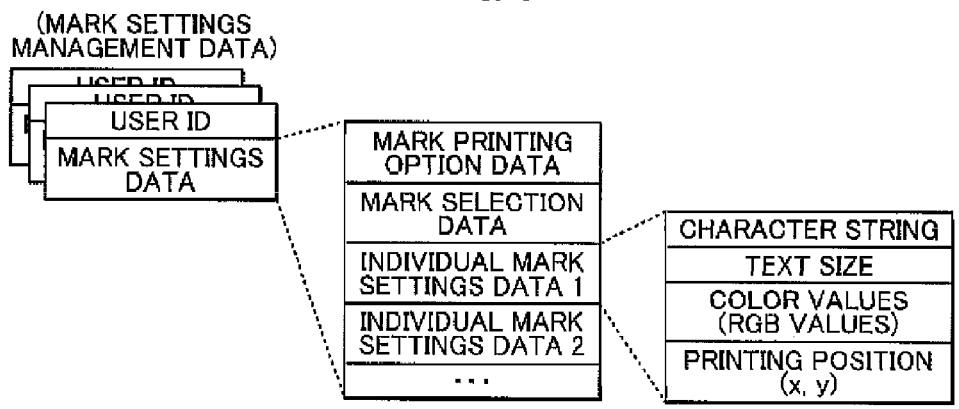
FIG. 3 is an explanatory diagram showing the structure of mark settings management data.

The mark settings management data used for generating the mark printing settings data is stored on the HDD 17. FIG. 3 is an explanatory diagram showing the structure of this data.

The mark settings management data includes mark settings data for each login user of the user terminal 10. The mark settings data includes mark printing option data, mark selection data, and individual mark settings data for each mark set by the user.

The mark printing option data indicates whether or not mark printing is required. The individual mark settings data describes mark configuration parameters indicating the configuration of a mark set by the user.

In the present embodiment, the configuration of a mark is defined by a character string to be printed as a mark, the text size of characters in the character string, color values (RGB values) of the characters, and a printing position for the mark. In other words, the mark configuration parameters include parameters for the character string, text size, color values, and printing position, all of which define the printing method (configuration) of the mark.

The mark selection data indicates an index number of a mark selected by the user from a plurality of user-created marks as the mark to be printed on the paper. A different index number is assigned to each of the individual mark settings data described above.

The CPU 11 executes a mark settings accepting program provided on the HDD 17 to update the mark settings data having this structure.

Figure 4:
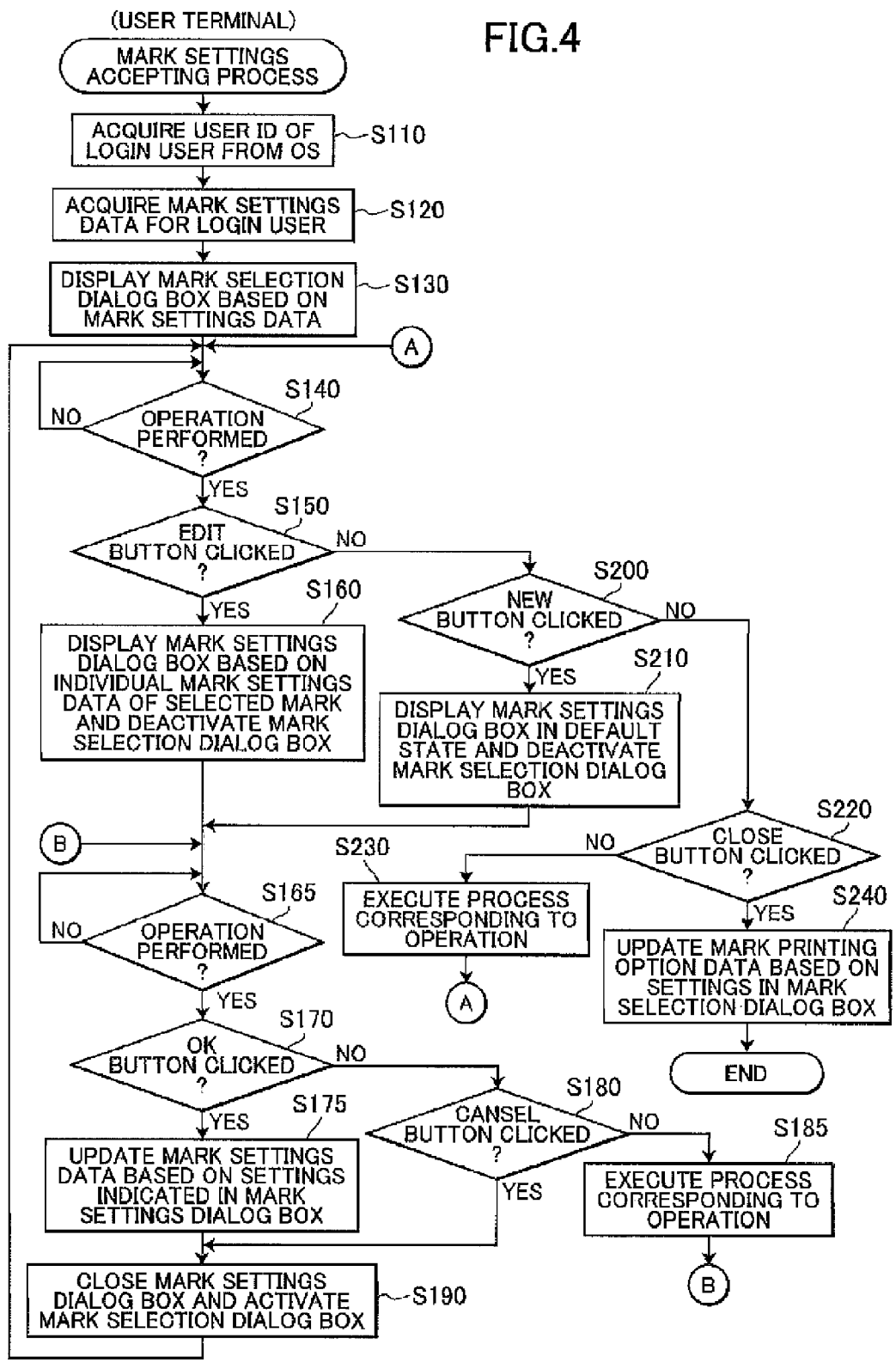
FIG. 4 is a flowchart illustrating steps in a mark settings accepting process executed by a CPU in the user terminal.

FIG. 4 is a flowchart illustrating steps in the mark settings accepting process performed when the CPU 11 executes the mark settings accepting program. The CPU 11 begins this process when the user performs an operation on the operating unit 23 to input mark settings.

In S110 at the beginning of the mark settings accepting process, the CPU 11 acquires identification data (user ID) from the OS for the current login user.

In S120 the CPU 11 reads mark settings data for the current login user from the mark settings management data stored in the HDD 17 based on the user ID acquired in S110. As shown in FIG. 3, the mark settings data for each user is recorded in the mark settings management data in association with the user ID. Hence, in S120 the CPU 11 reads from the HDD 17 mark settings data associated with the user ID of the current login user acquired from the OS.

If there exists no mark settings data associated with the user ID of the current login user, in S120 the CPU 11 writes default mark settings data in the mark settings management data in association with the user ID of the current login user to register mark settings data for the new user in the mark settings management data.

Figure 5A:
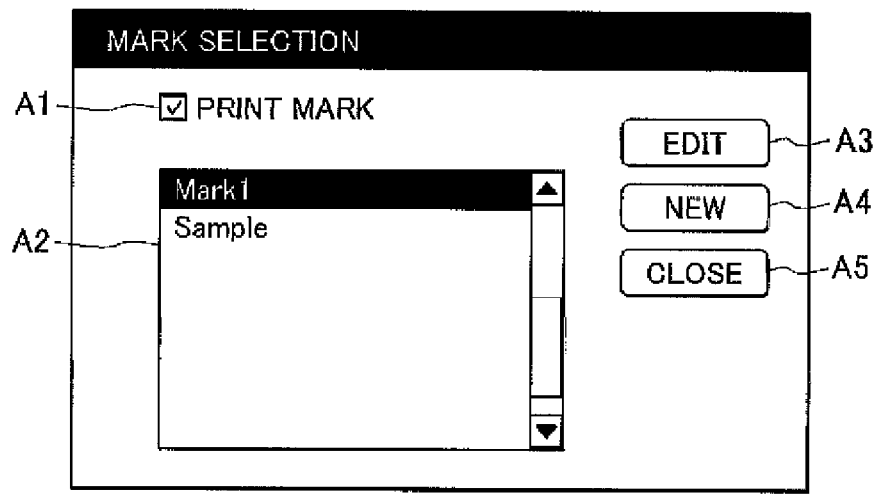
FIG. 5(*a*) is an explanatory diagram showing the structure of a mark selection dialog box.

In S130 the CPU 11 displays a mark selection dialog box shown in FIG. 5(*a*) on the display unit 21 based on the mark settings data for the current login user.

FIG. 5(*a*) is an explanatory diagram showing the structure of the mark selection dialog box. As shown in FIG. 5(*a*), the mark selection dialog box includes an input object (checkbox) A1 for selecting whether to print a mark, a mark selection area A2 in which the user can select a mark that has already been set, an Edit button A3, a New button A4, and a Close button A5.

Hence, when displaying the mark selection dialog box on the display unit 21, the CPU 11 displays a check in the input object A1 when the mark printing option data indicates that the mark is to be printed in the mark settings data of the current login user and does not display a check in the input object A1 when the mark printing option data indicates that mark printing is unnecessary. At the same time, in S130 the CPU 11 displays a character string in the mark selection area A2 for each mark represented by individual mark settings data in the order given in the mark settings data. If no individual mark settings data is listed in the mark settings data, then in S130 the CPU 11 displays the mark selection dialog box on the display unit 21 reflecting the current settings, with no character strings displayed in the mark selection area A2.

In S140 the CPU 11 waits until the user has performed an operation in the mark selection dialog box. When an operation has been performed in the mark selection dialog box (S140: YES), then in S150 the CPU 11 determines whether the operation performed was an operation to click the Edit button A3.

If the Edit button A3 was not clicked (S150: NO), then in S200 the CPU 11 determines whether the New button A4 was clicked. If the New button A4 was not clicked (S200: NO), then in S220 the CPU 11 determines whether the Close button A5 was clicked. If the Close button A5 was not clicked (S220: NO), then in S230 the CPU 11 executes a process in response to the operation performed.

For example, when the user selects one of the character strings for the marks listed in the mark selection area A2, the CPU 11 highlights the selected character string while leaving the other character strings in the list displayed normally. After executing the process in S230, the CPU 11 returns to S140 and waits for the user to perform another operation in the mark selection dialog box.

When the user clicks the Edit button A3 in the mark selection dialog box (S150: YES), in S160 the CPU 11 sets the individual mark settings data corresponding to the character string that was selected (highlighted) in the mark selection area A2 at the time the Edit button A3 was clicked to the processing target, displays the mark settings dialog box shown in FIG. 5(b) based on the individual mark settings data set as the processing target and the mark selection data for this user, and disables (deactivates) the mark selection dialog box.

Figure 5B:
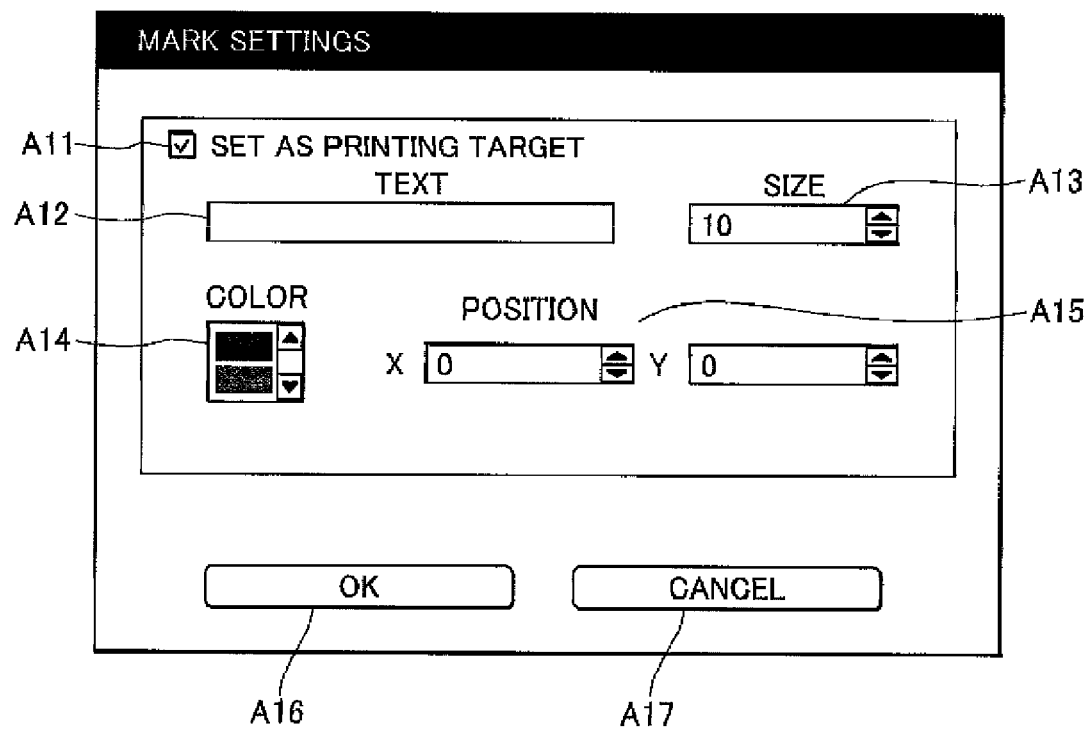

FIG. 5(b) is an explanatory diagram showing the structure of the mark settings dialog box. As shown in FIG. 5(b), the mark settings dialog box includes an input object (checkbox) A11 enabling the user to specify whether the mark being processed in the dialog box is the mark to be printed; an input object (textbox) A12 enabling the user to enter a character string to be inputted as a mark; an input object A13 enabling the user to enter the text size of the characters; an input object A14 enabling the user to set the text color; an input object A15 enabling the user to enter the printing position of the characters (mark); an OK button A16; and a Cancel button A17.

The input object A15 allows the user to input values for the X-axis and Y-axis as the printing position. The X-axis and Y-axis each have a length of 100 coordinates from one edge to the other edge of the paper (see FIG. 14).

Hence, in S160 the CPU 11 displays a check in the input object A11 when the index number of the mark specified in the mark selection data matches the index number in the individual mark settings data corresponding to the character string selected in the mark selection area A2 and does not display a check in the input object A11 when the index numbers do not match.

Further, the CPU 11 displays the mark settings dialog box with the character string specified in the individual mark settings data as the initial value in the input object A12, the text size indicated in the individual mark settings data as the initial value in the input object A13, the color value indicated in the individual mark settings data as the initial value in the input object A14, and the printing position indicated in the individual mark settings data as the initial value in the input object A15.

Through this process, the mark settings dialog box displayed on the display unit 21 has the currently set character string displayed in the input object A12, the currently set text size displayed in the input object A13, and the currently set printing position displayed in the input object A15. Further, a cursor is displayed in the input object A14 in the block having the color corresponding to the currently set color value, and a check is displayed or not displayed in the input object A11 depending on the setting.

After displaying the mark settings dialog box in S160, the CPU 11 waits in S165 until the user performs an operation in this dialog box. When an operation has been performed in the mark settings dialog box (S165: YES), the CPU 11 determines in S170 whether the user has clicked the OK button A16. If the OK button A16 has not been clicked (S170: NO), then in S170 the CPU 11 determines whether the Cancel button A17 has been clicked. If the Cancel button A17 has not been clicked (S180: NO), then in S185 the CPU 11 performs a process corresponding to the operation. Specifically, if the user performs an operation to input settings in the input objects A11-A15, the CPU 11 modifies the values set in the input objects A11-A15 according to the user's operation. Subsequently, the CPU 11 returns to S165 and waits for the user to perform another operation in the mark settings dialog box.

However, if the OK button A16 has been clicked (S170: YES), then in S170 the CPU 11 updates the individual mark settings data targeted for processing based on the values set in the input objects A12-A15 of the mark settings dialog box, and updates the mark selection data based on the current setting in the input object A11. Through this process, the CPU 11 reflects all content inputted via the mark settings dialog box in the individual mark settings data and the mark selection data.

The CPU 11 updates the mark selection data as follows. When the index number indicated in the mark selection data matches the index number in the individual mark settings data targeted for processing, the CPU 11 saves the content of the mark selection data without updating the data when the input object A11 is checked and sets the mark selection data to a null value when the input object A11 is not checked. A null value indicates that the mark is not selected.

However, if the index number indicated by the mark selection data does not match the index number in the individual mark settings data targeted for processing, the CPU 11 saves the content of the mark selection data without updating the data when the input object A11 is not checked and updates the index number (or null value) indicated by the mark selection data to the index number in the individual mark settings data targeted for processing when the input object A11 is checked.

After completing the process in S175, the CPU 11 performs a process in S190 to close the mark settings dialog box and restore the mark selection dialog box to an active state. Subsequently, the CPU 11 returns to S140 and waits for the user to perform an operation in the mark selection dialog box.

If the New button A4 has been clicked in the mark selection dialog box (S200: YES), in S210 the CPU 11 sets the initial values in the input objects A11-A15 to predetermined values and displays the mark settings dialog box on the display unit 21. As in the process of S160 described above, the CPU 11 deactivates the mark selection dialog box at this time.

Subsequently, the CPU 11 advances to S165 and performs the process described above to accept user settings in the mark settings dialog box. However, since individual mark settings data reflecting the current settings in the mark settings dialog box have not been recorded in the mark settings management data after the New button A4 was clicked in the mark selection dialog box, if the user clicks the OK button A16, then in S175 the CPU 11 records new individual mark settings data storing the values set in the mark settings dialog box under mark settings data for the login user, and updates the mark selection data when necessary based on the index number assigned to the new individual mark settings data.

Further, if the Close button A5 is clicked in the mark selection dialog box (S220: YES), then in S240 the CPU 11 reflects the setting in the input object A1 of the mark selection dialog box in the mark printing option data. In other words, the CPU 11 updates the mark printing option data to indicate that mark printing is required when the input object A1 is checked, and updates the mark printing option data to indicate that mark printing is not required when the input object A1 is not checked. Subsequently, the CPU 11 ends the mark settings accepting process.

Next, when the user inputs a print command via the operating unit 23, triggering the application program to input intermediate data to the printer driver via the OS, the CPU 11 executes a print control process according to the printer driver. The print control process will be described next.

FIG. 6 is a flowchart illustrating steps in the print control process executed by the CPU 11 according to the printer driver. The CPU 11 begins the print control process when the user inputs a print command. At the beginning of the process in S310 the CPU 11 acquires identification data (user ID) from the OS for the current login user.

In S320 the CPU 11 reads the mark settings data for the current login user from the mark settings management data stored in the HDD 17 based on the user ID acquired in S310. In S330 the CPU 11 determines whether the mark printing option data included in the mark settings indicates that mark printing is required. The CPU 11 advances to S335 if mark printing is required (S330: YES) and advances to S380 if mark printing is not required (S330: NO). As a matter of form, the CPU 11 makes a "no" determination in S330 and advances to S380 when mark settings data has not been registered in the mark settings management data for the current login user.

When advancing to S335, the CPU 11 determines whether a mark to be printed has been selected based on the mark selection data in the mark settings data of the login user. Specifically, the CPU 11 determines that a mark to be printed has not been selected (S335: NO) when the mark selection data is set to a null value and determines that a mark to be printed has been selected (S335: YES) when the mark selection data indicates an index number for a mark.

The CPU 11 advances to S340 upon determining that a mark to be printed has been selected (S335: YES) and advances to S380 upon determining that a mark to be printed has not been selected (S335: NO).

When advancing to S340 the CPU 11 generates mark printing settings data to be attached to the print data based on the individual mark settings data assigned the index number matching the index number in the mark selection data (see FIG. 7). Specifically, the mark printing settings data describes mark configuration parameters indicated by the individual mark settings data, and the user ID of the current login user.

After generating the mark printing settings data, in S350 the CPU 11 converts the intermediate data of the user data inputted from the application program via the OS to print data of the PDL format as data to be printed. In S360 the CPU 11 generates print data including the mark by attaching the mark printing settings data generated above to this print data. FIG. 7 is an explanatory diagram showing the structure of print data including a mark generated in S360.

Next, in S370 the CPU 11 transmits the print data including the mark to the printer 50 via the communication interface 19 together with a print request. Subsequently, the CPU 11 ends the print control process.

However, upon advancing to S380, the CPU 11 converts intermediate data for the user data inputted from the application program via the OS to print data in the PDL format as data to be printed. In S390 the CPU 11 transmits this print data to the printer 50 via the communication interface 19 together with a print request. In other words, when advancing to S380 the CPU 11 transmits print data to the printer 50 without attaching the mark printing settings data. Subsequently, the CPU 11 ends the print control process. The printer 50 performs a printing process with the print data and mark printing settings data transmitted above to form an image based on this data on paper.

In the communication system 1, print history data for each mark printed by the printer 50 is managed in a history file in the printer 50. The user terminal 10 has a function for acquiring the print history data for each mark registered in this history file as a mark list providing the usage status of the marks and for displaying this mark list on the display unit 21. The CPU 11 implements this function by executing the mark list displaying program stored on the HDD 17. Next, this function will be described with reference to FIGS. 8 and 9.

Figure 8:
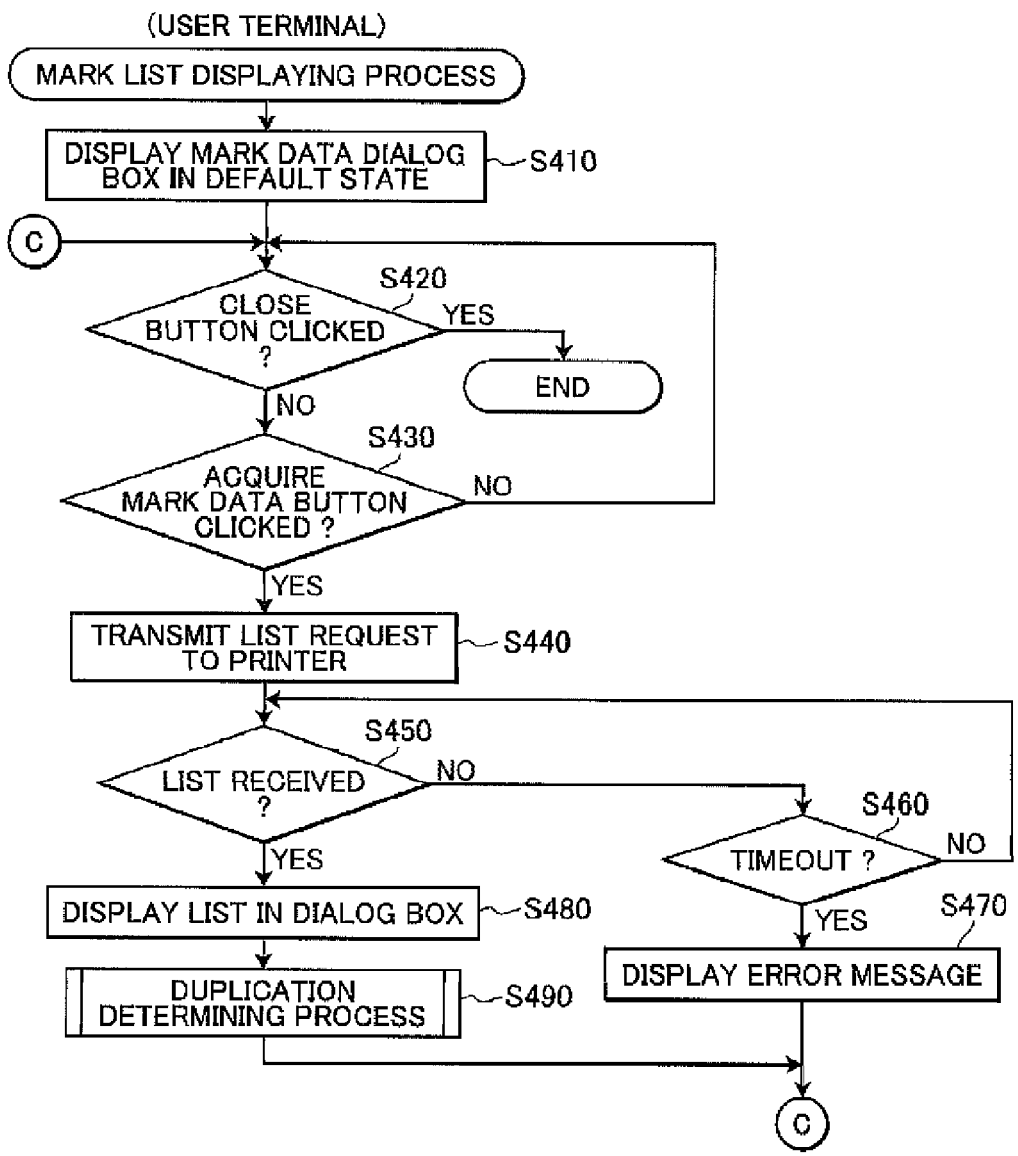
FIG. 8 is a flowchart illustrating steps in a mark list displaying process executed by the CPU in the user terminal.

FIG. 8 is a flowchart illustrating steps in the mark list displaying process executed by the CPU 11 according to the mark list displaying program. The CPU 11 begins the mark list displaying process when the user performs an operation on the operating unit 23 to display the mark list.

In S410 at the beginning of this process, the CPU 11 displays a mark data dialog box on the display unit 21 in a default state. The default state is the state in which the mark list is not displayed.

FIG. 9 is an explanatory diagram showing the structure of the mark data dialog box when the mark list is displayed. As shown in FIG. 9, the mark data dialog box includes a list display region for displaying the mark list, a Close button A21, and an Acquire Mark Data button A22.

After displaying the mark data dialog box on the display unit 21 in S410, the CPU 11 waits for the user to click either the Close button A21 (S420) or the Acquire Mark Data button A22 (S430) in the mark data dialog box. If the user clicks the Close button A21 in the dialog box (S420: YES), then the CPU 11 closes the mark data dialog box and ends the mark list displaying process.

However, if the user clicks the Acquire Mark Data button A22 in the dialog box (S430: YES), then in S440 the CPU 11 transmits a list request to the printer 50 via the communication interface 19. Upon receiving this list request, the printer 50 generates a mark list indicating print history data stored in the history file, provided that the history file is not empty, and transmits this mark list to the user terminal 10 that has issued the request (described later in greater detail with reference to FIGS. 12 and 13).

After transmitting the list request, the CPU 11 waits until a mark list is received from the printer 50 as response data (S450) or until a prescribed time has elapsed since the command was transmitted (S460).

If the prescribed time has elapsed (S460: YES), then in S470 the CPU 11 displays an error message in a window on the display unit 21 including an OK button (not shown). When the user clicks on the OK button in the error message window, the CPU 11 closes the error message window and returns to S420. Subsequently, the CPU 11 waits until the user performs another operation in the mark data dialog box (S420, S430).

However, if the CPU 11 receives a mark list from the printer 50 via the communication interface 19 after transmitting the list request (S450: YES), then in S480 the CPU 11 displays the mark list in the list display region of the mark data dialog box.

The mark list sequentially lists print history data including a user ID, a character string for a mark used by the user corresponding to the user ID, the text size of the mark, color values for the mark, the printing position of the mark, and the date and time when the mark was printed. Hence, in S480 the CPU 11 displays a list of the print history data in the list display region of the mark data dialog box. If the entire mark list cannot be displayed at one time in the mark data dialog box, the CPU 11 provides a scroll bar in the mark data dialog box enabling the user to scroll the mark list.

After displaying this mark list, the CPU 11 performs a duplication determining process in S490 and returns to S420. At this time, the CPU 11 waits until the user performs another operation in the mark data dialog box (S420, S430). When a scroll bar has been provided in the mark data dialog box, the CPU 11 can accept operations on the scroll bar while waiting for operations of the buttons A21 and A22 and can modify the section of the mark list displayed in the list display region based on these operations.

Figure 10:
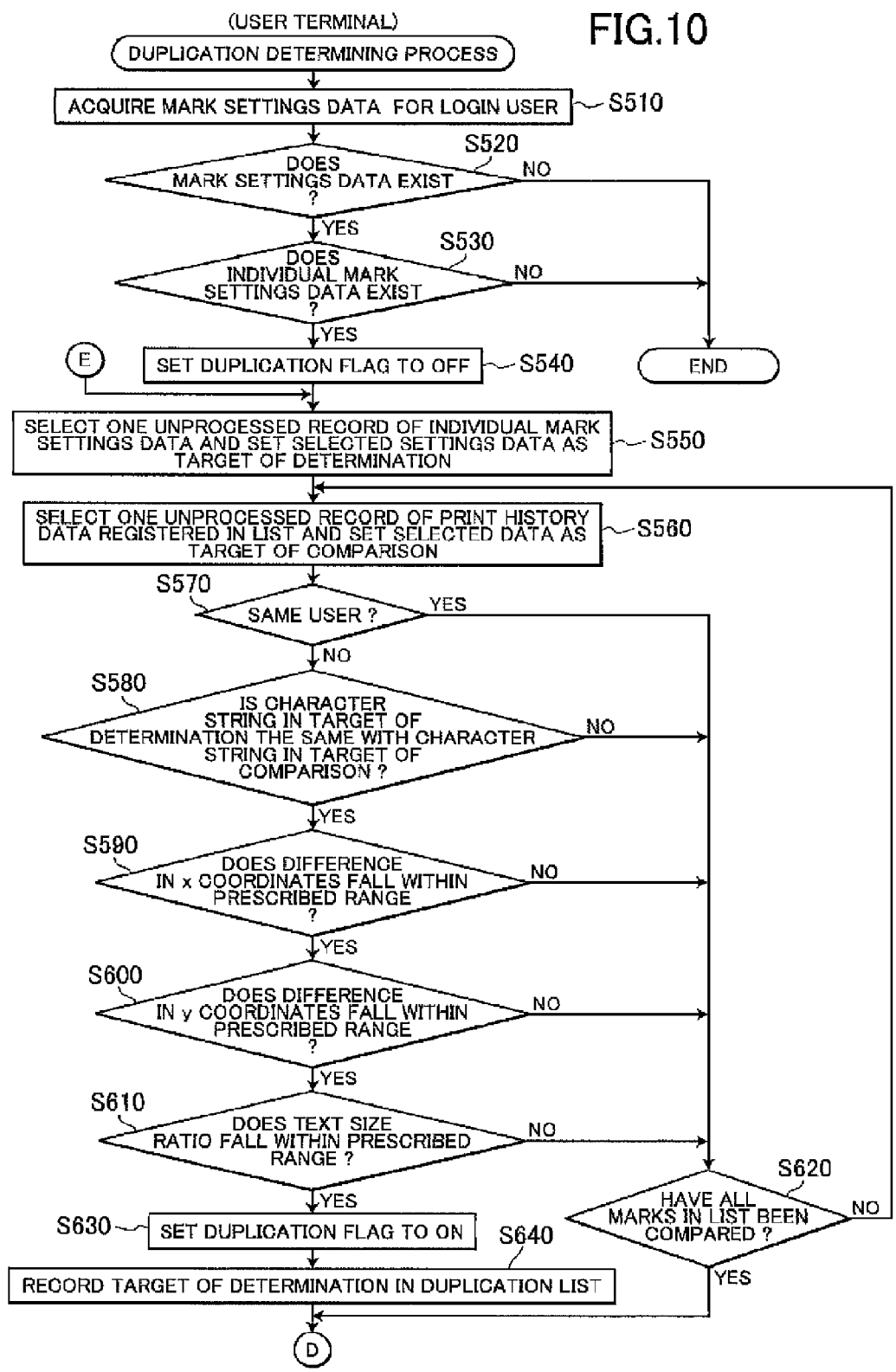
FIG. 10 is a flowchart illustrating steps in a duplication determining process executed by the CPU in the user terminal.
Figure 11:
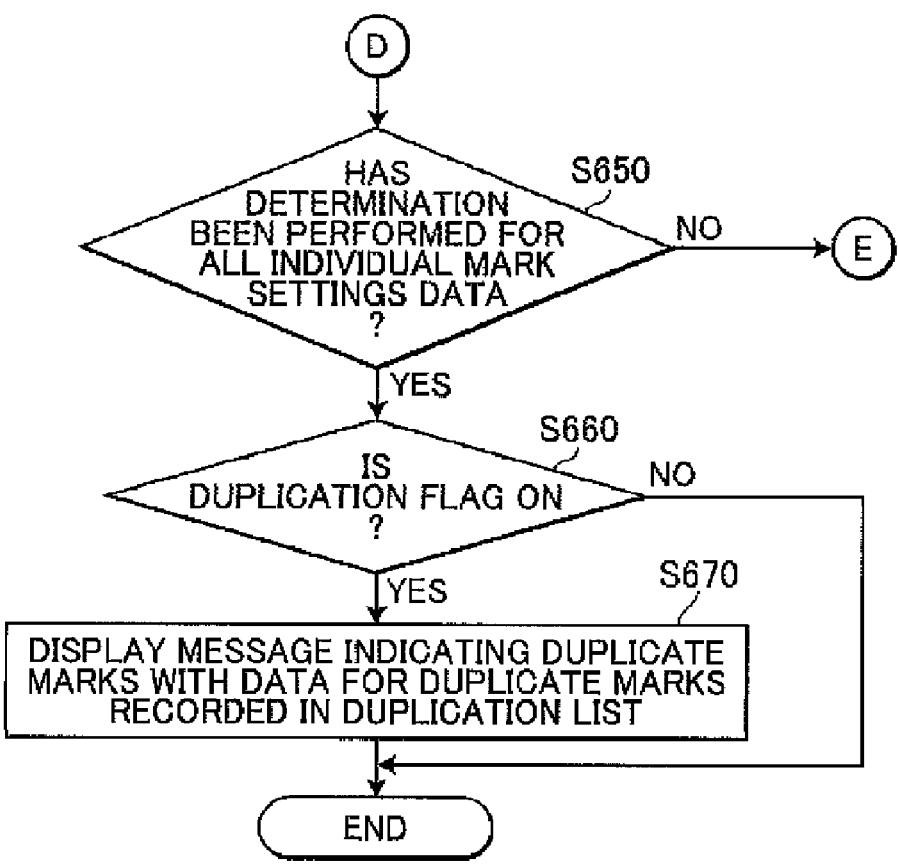
FIG. 11 is a flowchart illustrating the other remaining steps in the duplication determining process.

Next, the duplication determining process executed in S490 will be described in detail with reference to FIGS. 10 and 11. FIGS. 10 and 11 are flowcharts illustrating steps in the duplication determining process executed by the CPU 11.

At the beginning of the duplication determining process in S510, the CPU 11 acquires from the OS identification data (user ID) for the current login user and reads mark settings data for the current login user from the mark settings management data stored on the HDD 17 based on the acquired user ID. If mark settings data for the login user has not been registered in the mark settings management data (S520: NO), then the CPU 11 ends the duplication determining process.

However, if the CPU 11 has succeeded in reading mark settings data from the mark settings management data (S520: YES), then in S530 the CPU 11 determines whether the mark settings data includes at least one record of individual mark settings data. If the mark settings data does not include any individual mark settings data (S530: NO), indicating that a mark has not been set for the current login user, the CPU 11 ends the duplication determining process.

When the mark settings data includes individual mark settings data (S530: YES), then in S540 the CPU 11 sets a duplication flag to OFF and advances to S550. In S550 the CPU 11 selects one record of individual mark settings data that has not yet been selected as the target of determination from among all records of individual mark settings data in the mark settings data and sets the selected individual mark settings data as the target of determination.

In S560 the CPU 11 selects one record of print history data that has not yet been selected as a target of comparison from among all records recorded in the mark list and sets the selected print history data as the target of comparison. Subsequently, the CPU 11 compares the target of determination with the target of comparison in S570-S610 to determine whether the mark corresponding to the target of determination is the same as or similar to the mark corresponding to the target of comparison.

More specifically, in S570 the CPU 11 determines whether the user ID of the current login user having the mark corresponding to the target of determination matches the user ID indicated in the target of comparison. The CPU 11 advances to S620 if the user IDs match and advances to S580 if the user IDs do not match. This determination is performed because it is unnecessary to determine whether the marks are duplicates when the marks are used by the same user.

In S580 the CPU 11 determines whether the character string of the mark indicated by the target of determination matches the character string of the mark indicated by the target of comparison. The CPU 11 advances to S590 if the character strings match (S580: YES) and advances to S620 if the character strings do not match (S580: NO).

After advancing to S590 the CPU 11 determines whether the difference between the X coordinate x1 of the printing position indicated by the target of determination and the X coordinate x2 of the printing position indicated by the target of comparison ($|x1-x2|$) is no greater than a prescribed value $\Delta x$. In other words, the CPU 11 determines whether $|x1-x2| \leq \Delta x$.

The CPU 11 advances to S600 if $|x1-x2| \leq \Delta x$ (S590: YES) and advances to S620 if $|x1-x2| > \Delta x$ (S590: NO). In other words, the CPU 11 determines that the printing positions of the marks in the target of determination and target of comparison are similar and advances to S600 when the positions of the marks along the x-axis (along the width of the paper) differ by no greater than a length $\Delta x$. Here, $\Delta x$ may be set to 5, for example.

After advancing to S600, the CPU 11 determines whether the difference between the Y coordinate y1 of the printing position indicated by the target of determination and the Y coordinate y2 of the printing position indicated by the target of comparison ($|y1-y2|$) is no greater than a prescribed value $\Delta y$. In other words, the CPU 11 determines whether $|y1-y2| \leq \Delta y$. The CPU 11 advances to S610 if $|y1-y2| \leq \Delta y$ (S600: YES) and advances to S620 if $|y1-y2| > \Delta y$ (S600: NO). In other words, the CPU 11 determines that the printing position of the mark indicated by the target of determination and the mark indicated by the target of comparison are similar and advances to S610 when the position of the marks along the y-axis (along the length of the paper) differ by no greater than a distance $\Delta y$. Here, $\Delta y$ may be set to 5, for example.

After advancing to S610, the CPU 11 determines whether a ratio sz1/sz2 of a text size sz1 indicated in the target of determination and the text size sz2 indicated in the target of comparison falls within a range of a prescribed size $\Delta sz$ centered on the value 1. In other words, the CPU 11 determines whether $1-\Delta sz \leq sz1/sz2 \leq 1+\Delta sz$. The CPU 11 advances to S630 if the text size ratio sz1/sz2 falls within the prescribed range (S610: YES) and advances to S620 if the text size ratio sz1/sz2 is outside the prescribed range (S610: NO). In other words, the CPU 11 determines that the text sizes of the two marks are similar and advances to S630 when the text size ratio falls within the prescribed range.

After advancing to S630, the CPU 11 sets the duplication flag to ON and in S640 records the current target of determination in a duplication list. More specifically, the CPU 11 performs an operation to temporarily store the individual mark settings data for the target of determination in an area of memory as individual mark settings data of a duplicated mark. Subsequently, the CPU 11 advances to S650 in FIG. 11.

On the other hand, when the CPU 11 advances to S620, the CPU 11 determines whether the process from S570 has been performed with all records of the print history data recorded in the mark list as targets of comparison. The CPU 11 advances to S650 if the process has been performed for all records (S620: YES) and returns to S560 if the process has not been performed for all records (S620: NO). After returning to S560, the CPU 11 selects a record of print history data not yet selected as the target of comparison and repeats the process from S570 described above on the new target of comparison.

Therefore, in the duplication determining process described above, the CPU 11 repeatedly executes the process of S560-S620 until the process has been performed for all records of print history data in the mark list or until the CPU 11 detects print history data other than that recorded through a printing operation performed by the current login user in which the mark has a character string matching that of the mark indicated by the target of determination with a similar printing position and a similar text size. If the CPU 11 detects print history data for a mark with the same character string and similar printing position and similar text size to the mark in the target of determination, the CPU 11 sets the duplication flag to ON and advances to S650 of FIG. 11.

Upon advancing to S650, the CPU 11 determines whether all records of individual mark settings data listed in the login user's mark settings data have been selected as the target of determination. If there remain any records of individual mark settings data that have not yet been selected as the target of determination (S650: NO), then the CPU 11 returns to S550 to select another record of individual mark settings data not yet selected, sets this record as the new target of determination, and repeats the process from S560 described above.

However, if all records of individual mark settings data have been selected as the target of determination (S650: YES), then in S660 the CPU 11 determines whether the duplication flag is set to ON. If the duplication flag has been set to ON (S660: YES), then in S670 the CPU 11 displays a warning message in a window on the display unit 21 indicating that duplicate marks exist. When displaying this message, the CPU 11 also displays data for the duplicated mark (such as the character string of the mark) in the warning message window based on the individual mark settings data recorded in the duplication list.

The warning message window includes an OK button (not shown). After displaying the window, the CPU 11 waits until the user clicks the OK button. At this time, the CPU 11 closes the warning message window and ends the duplication determining process.

However, if the CPU 11 determines in S660 that the duplication flag is not set to ON (S660: NO), then the CPU 11 ends the duplication determining process without displaying the warning message window.

In the embodiment, the CPU 11 determines the similarity between each mark set by the login user and marks indicated in the mark list. If marks set by the login user are similar to marks in the mark list, the CPU 11 displays the warning message window to notify the login user that marks set by the login user are used by another user and prompts the login user to modify the marks.

Next, the structure of the printer 50 will be described in greater detail. The printer 50 is capable of receiving a print request and a list request from the user terminals 10.

As shown in FIG. 1, the printer 50 constituting the communication system 1 includes a controller 51 for controlling the overall operations of the printer 50; a recording unit 53 for forming images (printing) on paper according to the inkjet method or laser printing method; a display/control unit 55 configured of operating keys enabling user operations, a liquid crystal display, and the like; a communication interface 57 implementing bi-directional communications with user terminals 10 on the network NT; and a data storage unit 59.

The controller 51 includes a CPU 51a for performing various arithmetic processes, a ROM 51b for storing various programs executed by the CPU 51a, and a RAM 51c used as a work area when the CPU 51a executes the programs. The CPU 51a implements printing operations on the recording unit 53 by executing the various programs stored in the ROM 51b.

The data storage unit 59 functions to store history files and various settings and is configured of a storage device capable of preserving the data after the power to the printer is turned off. For example, the data storage unit 59 may be configured of a storage device, such as an EEPROM, flash memory, or a hard disk drive capable of electrically rewriting data.

Figure 12:
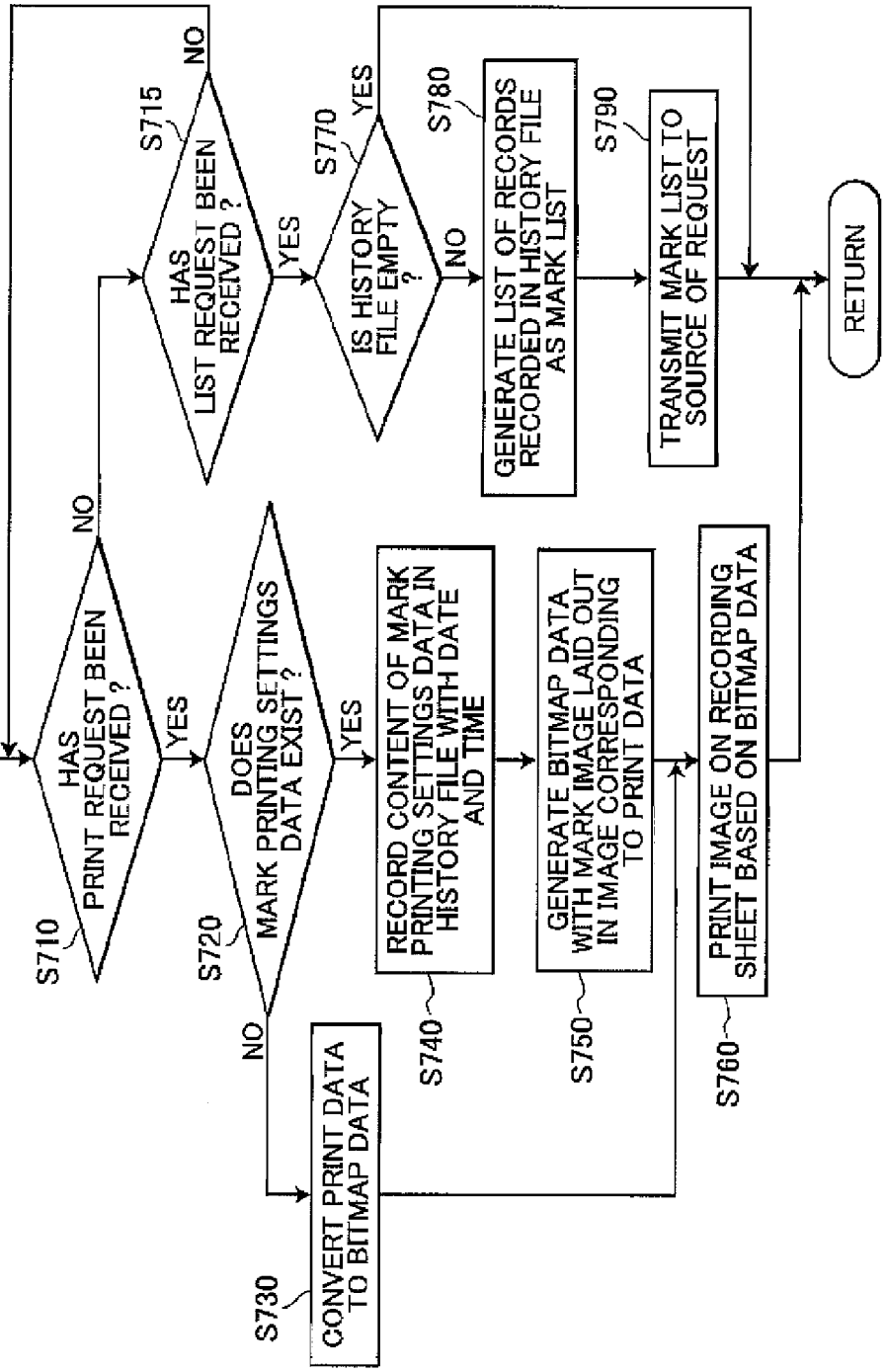
FIG. 12 is a flowchart illustrating steps in a request accepting process executed by a controller in the printer.

In the printer 50 having this hardware configuration, the CPU 51a of the controller 51 executes a request accepting process for accepting a print request or list request from the user terminals 10. When a print request is inputted, the printer 50 prints an image on paper using the recording unit 53 based on print data received together with the print request. FIG. 12 is a flowchart illustrating steps in the request accepting process repeatedly executed by the CPU 51a based on the program stored in the ROM 51b. The controller 51 repeatedly executes the request accepting process shown in FIG. 12 from the moment the power to the printer 50 is turned on until the power is shut down.

At the beginning of the request accepting process, the controller 51 waits until a print request (S710) or a list request (S715) is received via the network NT.

When a print request is received (S710: YES), in S720 the controller 51 determines whether the data received together with the print command is print data including mark printing settings data. If the received data is normal print data that does not include mark printing settings data (S720: NO), then in S730 the controller 51 converts the print data to bitmap data for each page and in S760 performs a printing process to print an image based on the bitmap data for each page on paper using the recording unit 53. Subsequently, the controller 51 temporarily ends the request accepting process.

However, if the controller 51 determines that the print data includes mark printing settings data (S720: YES), then in S740 the controller 51 records a user ID and the mark configuration parameters included in the mark printing settings data in the history file as print history data. At this time, the controller 51 also records the date and time in the history file indicating the printing time.

Figures 13, 14:
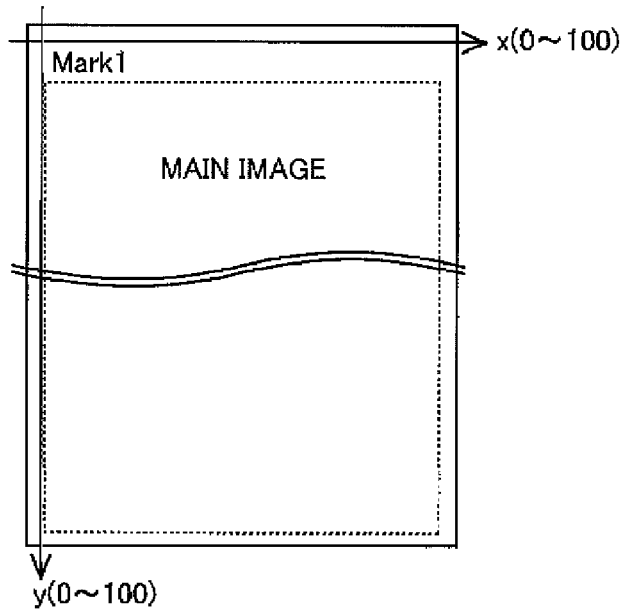
FIG. 13 is an explanatory diagram showing the structure of a history file.
FIG. 14 is an explanatory diagram showing the printed state of a mark.

FIG. 13 is an explanatory diagram illustrating the structure of the print history data in the form of records stored in the history file. As shown in FIG. 13, each record in the history file (i.e., the print history data) includes the user ID from the mark printing settings data (i.e., identification data for the user instructing the mark to be printed), a character string representing the mark, the text size of the mark, the color values of the mark, the printing position of the mark, and the printing time.

In S750 the controller 51 converts the print data to bitmap data for each page and generates bitmap data representing an image of the mark based on the mark printing settings data. Next, the controller 51 superimposes the bitmap data representing the image of the mark in a region of the bitmap data converted from the print data that corresponds to the printing position of the mark to combine the bitmap data. Through this process of S750, the controller 51 generates bitmap data for each page with the image of the mark laid out in the image corresponding to the main print data.

When superimposing bitmap data representing the mark image over the bitmap data converted from the print data, the bitmap data representing the mark image may simply be written over the bitmap data converted from the print data in the region corresponding to the printing position of the mark. Further, the bitmap data representing the image of the mark may be processed to produce a watermark image before laying out the image on the bitmap data converted from the print data.

In S760 the controller 51 performs a printing process on the bitmap data for each page generated in S750 to print an image based on the bitmap data for each page on paper using the recording unit 53. Specifically, the controller 51 performs a process to print the main image corresponding to the main print data together with an image of the mark indicated by the mark printing settings data on paper for each page, as shown in FIG. 14. After completing this process, the controller 51 temporarily ends the request accepting process.

On the other hand, if a list request is received (S715: YES), then in S770 the controller 51 determines whether the history file is empty, i.e., whether no records (print history data) have been recorded in the history file. If the history file is not empty (S770: NO), then in S780 the controller 51 generates a mark list including each record recorded in the history file as response data. In S790 the controller 51 transmits this mark list to the source of the list request via the network NT. Subsequently, the controller 51 temporarily ends the request accepting process.

However, if the history file is empty (S770: YES), then the controller 51 temporarily ends the request accepting process without executing the processes in S780 and S790.

By repeatedly executing the request accepting process described above, the controller 51 accepts print requests and list requests from the user terminals 10 via the network NT.

Figure 15:
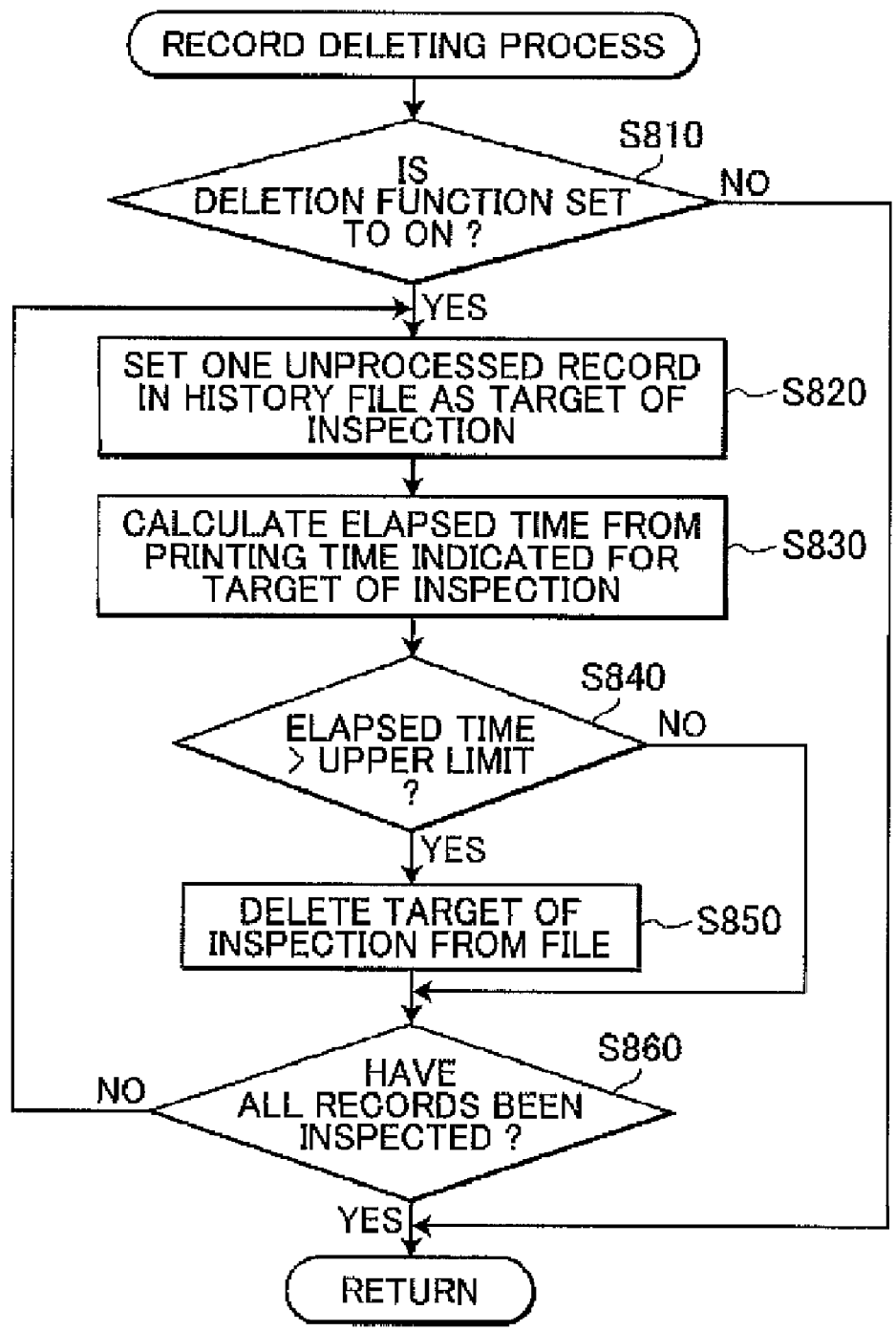
FIG. 15 is a flowchart illustrating steps in a record deleting process executed by the controller in the printer.

The controller 51 also has a function for deleting records (print history data) from the history file as needed. The CPU 51a of the controller 51 implements this function by executing a record deleting process shown in FIG. 15 based on a program stored in the ROM 51b. FIG. 15 is a flowchart illustrating steps in the record deleting process executed by the controller 51. The controller 51 repeatedly executes the record deleting process of FIG. 15 from the moment the power to the printer 50 is turned on until the power is shut down.

At the beginning of the record deleting process in S810, the controller 51 determines whether the deletion function is set to ON based on the settings stored in the data storage unit 59. The printer 50 is capable of switching the deletion function on and off based on user operations performed via the display/control unit 55.

If the deletion function is set to ON (S810: YES), then in S820 the controller 51 selects an unprocessed record (print history data) from among the records recorded in the history file as the target of inspection, and in S830 calculates the amount of time that has elapsed since the printing time indicated by the selected target of inspection.

In S840 the controller 51 determines whether the elapsed time calculated in S830 exceeds a predetermined upper limit. If the elapsed time exceeds this upper limit (S840: YES), then in S850 the controller 51 performs a process to delete the record set as the target of inspection from the history file, and subsequently advances to S860. However, if the elapsed time has not exceeded the upper limit (S840: NO), then the controller 51 advances to S860 without executing the process in S850.

In S860 the controller 51 determines whether the process in S830 and S840 has been executed with all records in the history file. If the controller 51 determines that not all of the records in the history file have been selected as the target of inspection (S860: NO), then the controller 51 returns to S820 and repeats the process of S820-S860 until all records have been selected as the target of inspection.

Once the process from S830 has been performed with all records in the history file selected as the target of inspection (S860: YES), the controller 51 ends the record deleting process.

With the communication system 1 described above, the printer 50 prints an image on paper based on print data received via the network NT and prints a mark set by the transmitting source of the print data on the paper together with the print data based on mark configuration parameters in the mark printing settings data received with the print data as a mark incident to the image based on the print data.

The printer 50 also has a history file stored in the data storage unit 59. Based on the mark printing settings data received with the print data, the printer 50 records in the history file a combination of a user ID identifying a user who uses a mark and mark configuration parameters indicating configuration of the mark as a set of print history data. When a list request is received from a user terminal 10, the printer 50 transmits via the network NT a mark list including each record of print history data recorded in the history file to the user terminal 10 that was the source of the request.

When converting user data generated by an application program to print data and transmitting this print data to the printer 50 with a print request, the user terminal 10 attaches mark printing settings data to the print data when necessary for instructing the printer 50 to print a mark.

Specifically, when a user issues a print command, the user terminal 10 records, in the mark printing settings data, mark configuration parameters for a mark that has been preset by the same user in association with the user ID of the user based on mark settings data that has been established for the mark through user operations on the operating unit 23. When the user terminal 10 transmits the mark printing settings data to the printer 50, the printer 50 is prompted to print the mark on paper together with an image based on the print data.

Further, when the user issues a command on the operating unit 23 to display the mark list, the user terminal 10 transmits a list request to the printer 50 and displays the mark list received from the printer 50 in response to this command on the display unit 21.

In this way, the communication system 1 notifies the user terminal 10 of users and parameters for each mark printed by the printer 50. Hence, the communication system 1 can reduce the likelihood of the same or similar marks being used for different users. Therefore, the communication system 1 effectively reduces the likelihood of a user mistakenly retrieving paper outputted in association with the print command issued by another user.

By performing an operation to display the mark list, the user can easily view the mark list at a desired timing. Hence, the communication system 1 enables the user to confirm whether a mark has duplicates as needed, thereby sufficiently reducing the likelihood of duplicate marks being used by different users.

Each time a user terminal 10 transmits print data corresponding to user data created in an application program to the printer 50, the user terminal 10 attaches mark printing settings data to the print data when mark printing is required, and manages the mark settings internally. Hence, the communication system 1 is very convenient in that modifications in mark settings can be managed by the user terminal 10 internally.

Further, if the same or similar marks are being used by different users, the user terminal 10 displays a message on the display unit 21 indicating these duplicate marks. In this way, the user terminal 10 can prompt the user to modify the mark settings, effectively reducing the likelihood of a user mistakenly taking printed output for a different user from the discharge tray of the printer due to the same or similar marks being used by different users.

Further, the printer 50 is configured to delete records of print history data from the history file when the data has been stored for a length of time exceeding a predetermined upper limit. In this way, the printer 50 can reduce the amount of data accumulated in the history file and can reduce the likelihood of a user misunderstanding the current usage status of marks by not displaying old print history data (print history data for marks not currently in use) on the user terminal.

The print control process of the embodiment described above may be modified in the following way.

Figure 16:
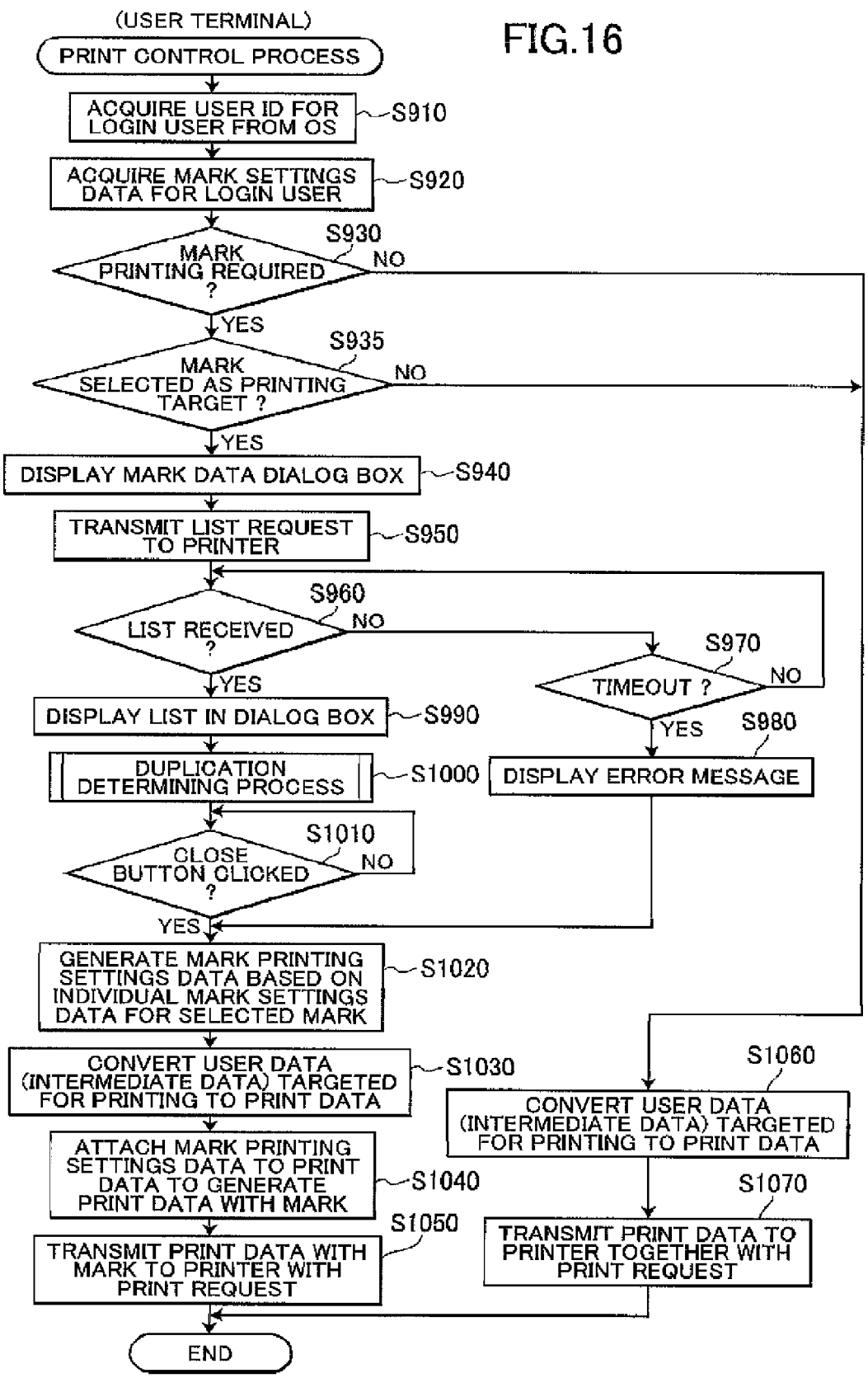
FIG. 16 is a flowchart illustrating steps in a print control process according to a variation of the embodiment.

FIG. 16 is a flowchart illustrating steps in a print control process executed by the CPU 11 in each user terminal 10 according to a variation of the communication system 1 in place of the print control process described in FIG. 6. Since the communication system 1 according to the variation described below differs from the communication system 1 in the embodiment described above only in part of the print control process, the following description will only cover the content of the print control process according to the variation of the communication system 1.

The CPU 11 begins the print control process shown in FIG. 16 when the user issues a print command. At the beginning of this process in S910 the CPU 11 acquires identification data (user ID) from the OS for the current login user. In S920 the CPU 11 reads mark settings data for the current login user from the mark settings management data stored in the HDD 17 based on the user ID acquired in S910.

In S930 the CPU 11 determines whether the mark printing option data in the mark settings data read in S920 indicates that mark printing is required. The CPU 11 advances to S935 if mark printing is required (S930: YES) and advances to S1060 if mark printing is not required (S930: NO). As a matter of form, the CPU 11 reaches a NO determination in S930 and advances to S1060 when no mark settings data for the current login user is recorded in the mark settings management data.

When advancing to S935, the CPU 11 determines whether a mark to be printed has been selected based on the mark selection data in the mark settings data for the login user, as described above in S335. The CPU 11 advances to S940 if a mark to be printed has been selected (S935: YES) and advances to S1060 if a mark to be printed has not been selected (S935: NO).

When advancing to S940, the CPU 11 displays the mark data dialog box on the display unit 21 in the default state, and in S950 transmits a list request to the printer 50 via the communication interface 19. After transmitting the list request, the CPU 11 waits until a mark list has been received from the printer 50 in response to the list request (S960) or a prescribed time has elapsed (S970). If the prescribed time has elapsed (S970: YES), in S980 the CPU 11 displays an error message window on the display unit 21. After the user clicks on an OK button (not shown) provided in the error message window, the CPU 11 closes the error message window and the mark data dialog box and advances to S1020.

However, if the CPU 11 receives a mark list from the printer 50 via the communication interface 19 after transmitting the list request (S960: YES), then in S990 the CPU 11 performs the process described above in S480 to display the mark list in the list display region of the mark data dialog box.

After displaying the mark list, the CPU 11 performs the duplication determining process of FIGS. 10 and 11 in S1000 and subsequently advances to S1010. However, when performing the duplication determining process of FIGS. 10-11 in S1000 of this modification, the individual mark settings data selected as the target of determination is only the individual mark settings data that is assigned the index number indicated in the mark selection data of the mark settings data read in S920. Other individual mark settings data is not selected as the target of determination. In other words, in the duplication determining process of FIGS. 10-11, the CPU 11 selects in S550 as a target of determination one set of individual mark settings data that is assigned an index number matching the index number indicated by the mark selection data in the mark settings read in S920, and the CPU 11 skips the process of S650 and advances to S660. Thus, the CPU 11 performs the process of S560-S650 only once. In other words, the CPU 11 performs the process of S560-S650 only for the mark that is now being selected to be printed.

In S1010 the CPU 11 waits until the user clicks on the Close button in the mark data dialog box. Once the user clicks on the Close button, the CPU 11 closes the mark data dialog box and advances to S1020.

In S1020 the CPU 11 performs the process described above in S340 to generate mark printing settings data to be attached to the print data based on the individual mark settings data assigned the index number matching the index number indicated in the mark selection data of the mark settings data read in S920.

In S1030 the CPU 11 converts intermediate data for the user data inputted from an application program via the OS to print data in the PDL format. In S1040 the CPU 11 generates print data with a mark by attaching the mark printing settings data generated above to the print data.

In S1050 the CPU 11 transmits the print data with the mark to the printer 50 via the communication interface 19 together with a print request. Subsequently, the CPU 11 ends the print control process.

When advancing to S1060, the CPU 11 converts intermediate data for the user data inputted from an application program via the OS to print data of the PDL format, and in S1070 transmits this print data to the printer 50 via the communication interface 19 together with a print request. In other words, the CPU 11 transmits print data to the printer 50 without attaching mark printing settings data. Subsequently, the CPU 11 ends the print control process.

With the communication system 1 according to the variation described above, the user terminal 10 displays a mark list on the display unit 21 each time a printing operation is performed and displays a warning message when duplicate marks exist. Therefore, the communication system 1 can frequently prompt the user to confirm whether duplicate marks exist and can effectively reduce the likelihood of such duplications.

More specifically, according to this variation, the user terminals are configured to acquire the latest data on users of marks and mark configuration parameters each time a printing operation is performed. With this construction, the user terminal displays the most recently used user data and mark configuration parameters on the display each time the user performs a printing operation. Accordingly, the user will not forget to confirm each time a printing operation is performed whether there are any duplicates of the user's mark.

In other words, the communication system of this variation ensures that the user frequently confirms whether such duplicates exist, thereby reducing the likelihood of different users using same or similar marks.

While the invention has been described in detail with reference to the embodiment thereof, it would be apparent to those skilled in the art that various changes and modifications may be made therein without departing from the spirit of the invention.

For example, in the embodiment and its variation described above, the function for accumulating print history data and transmitting a mark list based on this accumulated data is provided in the printer 50, but this function may be provided in a server device separate from the printer 50.

Specifically, the separate server device can acquire print history data from the printer 50 via the network NT and accumulate this data in an internal storage device. When a request is received from a user terminal 10, the server generates a mark list based on the data accumulated in the storage device on the server and transmits this mark list to the user terminal 10 that has issued this request.

The embodiment has been described under the assumption that unique user IDs are assigned to and managed for each user of the communication system 1. However, the communication system 1 may be modified such that the users of each user terminal 10 can assign themselves a desired user ID without relation to the users of other user terminals 10 and therefore that different personnel may possibly set the same user ID for their respective user terminals 10.

Hence, when the communication system 1 is modified to have this configuration, the printer 50 may be configured to attach the node address of the transmission source of mark printing settings data to the print history data when recording print history data in the history file and to transmit a code made from a combination of the user ID and node address to the user terminal 10 in place of the user ID when transmitting a mark list. With the modified communication system 1 having this construction, the user terminal 10 can perform the duplication determining process normally by using the code in place of the user ID.

Further, when the communication system 1 is modified to assign a separate user terminal 10 to each user, the node address of the user terminal 10 may be used as the identification data for the user.

Each of the programs described above with reference to FIGS. 4, 6, 8, 10-12, 15, and 16 can be recorded on a storage medium, such as an optical disk, magnetic disk, or semiconductor memory, and provided externally.

In the above-described embodiment and variation, each mark is constituted from a character string. However, each mark may be constituted from other various types of marks, such as a symbol, an illustration, or the like.

In the above-described embodiment, the CPU 11 determines in S580-S610 whether mark configuration parameters are the same or similar for multiple marks by comparing the values of the mark configuration parameters, i.e., values representing the shape, size, and printing position of the marks. Because the marks are configured of characters, the values representing the shapes of the marks are configured of values representing the character strings. So, the CPU 11 determines in S580 whether all the characters constituting the character strings of the marks overlap with each other.

In S580, the CPU 11 judges whether or not the character string of the mark indicated by the target of determination is exactly the same as the character string of the mark indicated by the target of comparison. However, the CPU 11 may judge whether or not the character string of the mark indicated by the target of determination is similar to the character string of the mark indicated by the target of comparison based on the degree to which characters constituting the character string of the target of determination overlap characters constituting the character string of the target of comparison. For example, the CPU 11 may determine that the character string of the mark indicated by the target of determination is similar to the character string of the mark indicated by the target of comparison when the number of characters, among the characters constituting the character string of the target of determination, that are the same as the characters, among the characters constituting the character string of the target of comparison, is greater than a prescribed threshold.

In the above-described embodiment and variation, the mark configuration parameters include the shape (character string), size, color, and printing position of the mark that are capable of defining the configuration of the mark (printed state). However, the mark configuration parameters may include at least one of the shape, size, color, and printing position of the mark.

In addition, the color values of marks may be used as the basis of determining duplicate marks. That is, the CPU 11 may determine whether mark configuration parameters are the same or similar for multiple marks by comparing the values for at least one of the shape, size, color, and printing position of the marks.

What is claimed is:

1. A communication system comprising:
   at least one user terminal connected to a network;
   a printer configured to perform bi-directional communications with each user terminal via the network, the printer comprising a print controlling unit that prints an image on a recording sheet based on target print data received from a user terminal, and that prints on the same recording sheet a mark set by the user terminal, from which the target print data has been received, according to a mark configuration parameter indicating configuration of the mark;
   a storage device;
   a processor; and
   memory storing computer executable instructions that, when executed, cause the processor to function as:
      a registering unit that records in the storage device a combination of a mark configuration parameter and corresponding identification data that is received from one of the at least one user terminal, the mark configuration parameter indicating configuration of a mark that has been set at the one of the at least user terminal, the identification data identifying one user that has set the mark; and
      a list transmitting unit that transmits to each user terminal data of a mark list that lists at least one combination of the mark configuration parameter and the corresponding identification data that has been stored in the storage device,
   each user terminal comprising:
      an inputting unit that receives user operations;
      a displaying unit that displays data;
      a user terminal processor; and
      user terminal memory storing computer executable instructions that, when executed, cause the user terminal processor to function as:
         a parameter setting unit that sets, according to input operations received via the inputting unit, a mark configuration parameter indicating configuration of a mark desired to be added to an image desired to be printed based on the target print data;

a data transmitting unit that transmits a combination of the mark configuration parameter and identification data of a user that has set the mark configuration parameter to the printer via the network, the data transmitting unit transmitting target print data to the printer via the network when a printing command is received via the inputting unit; and a user data display controlling unit that displays on the displaying unit the mark list based on the data of the mark list received via the network.

2. The communication system according to claim 1, wherein the storage device, the processor, and the memory are housed in the printer.

3. The communication system according to claim 1, wherein each user terminal memory stores computer executable instructions that, when executed, cause the respective user terminal processor to further function as a transmission requesting unit that issues a request to the list transmitting unit for the transmission of the data of the mark list when a command for acquiring the mark list is received via the inputting unit;

wherein the list transmitting unit transmits the data of the mark list to the user terminal, from which the transmission request has been received, when a transmission request for the data of the mark list is received from the user terminal via the network.

4. The communication system according to claim 1, wherein each user terminal memory stores computer executable instructions that, when executed, cause the respective user terminal processor to further function as a transmission requesting unit that issues a request to the list transmitting unit for the transmission of the data of the mark list when a printing operation is received by the inputting unit;

wherein the list transmitting unit transmits the data of the mark list to the user terminal, from which the transmission request has been received, when a transmission request for the mark list is received from the user terminal via the network.

5. The communication system according to claim 1, wherein, when a user performs an operation for printing target print data on the inputting unit of the at least one user terminal, the data transmitting unit of the at least one user terminal transmits the target print data to the printer, and wherein every time the data transmitting unit transmits the target print data to the printer, the data transmitting unit transmits a combination of a mark configuration parameter and identification data in association with the target print data, the mark configuration parameter indicating configuration of a mark set by the at least one user of the user terminal through a setting operation on the inputting unit, the identification data identifying the user that has performed the setting operation, to instruct the printer to print an image based on the transmitted target print data on a recording sheet and to print a mark based on the mark configuration parameter on the recording sheet.

6. The communication system according to claim 1, wherein each user terminal memory stores computer executable instructions that, when executed, cause the respective user terminal processor to further function as:

a determining unit that determines, for a target mark set by a target user on each user terminal, whether the mark list includes a combination of identification data and a mark configuration parameter, whose identification data identifies a user other than the target user but whose mark configuration parameter is the same as or similar to a mark configuration parameter for the target mark; and an alerting unit that issues an alert via the displaying unit when the determining unit determines that the mark list includes a combination of identification data and a mark configuration parameter, whose identification data identifies a user other than the target user but whose mark configuration parameter is the same as or similar to the mark configuration parameter for the target mark.

7. The communication system according to claim 1, wherein the mark configuration parameter includes data for at least one of shape, size, color, and printing position of the mark.

8. The communication system according to claim 1, wherein, each time the print controlling unit prints an image and a mark based on the target print data and the mark configuration parameter, the registering unit records, as history data, a combination of the mark configuration parameter indicating the configuration of the mark and identification data for the user that has set the mark in the storage device together with data for the date and time when the print controlling unit prints the image and the mark; and the memory stores computer executable instructions that, when executed, cause the processor to further function as a deleting unit that deletes history data from the storage device when a prescribed length of time has elapsed since time indicated by the time and date recorded with the history data.

9. The communication system according to claim 1, wherein the identification data includes a user identification corresponding to a current login user of an operating system of a user terminal.

10. A printer comprising:

a communication unit that is connected to at least one user terminal via a network and that is configured to of perform bi-directional communications with the at least one user terminal via the network;

a print controlling unit that prints an image on a recording sheet based on target print data that has been received from a user terminal, and that prints on the same recording sheet a mark set by the user terminal, from which the target print data has been received, according to a mark configuration parameter indicating configuration of the mark;

a storage device;

a processor; and memory storing computer executable instructions that, when executed, cause the processor to function as:

a registering unit that records in the storage device a combination of a mark configuration parameter and corresponding identification data that is received from one of the at least one user terminal, the mark configuration parameter indicating configuration of a mark that has been set at the one of the at least one user terminal, the identification data identifying one user that has set the mark; and a list transmitting unit that transmits to each user terminal data of a mark list that lists at least one combination of the mark configuration parameter and the corresponding identification data that has been stored in the storage device.

11. The printer according to claim 10, wherein the list transmitting unit transmits the data of the mark list to one user terminal, from which a transmission request has been received, when the transmission request for the data of the mark list is received from the user terminal via the network.

12. The printer according to claim 10, wherein, each time the print controlling unit prints an image and a mark based on the target print data and the mark configuration parameter, the registering unit records, as history data, a combination of the mark configuration parameter and identification data for the user that has set the mark in the storage device together with data for the date and time when the print controlling unit prints the image and the mark; and the memory stores computer executable instructions that, when executed, cause the processor to further function as a deleting unit that deletes history data from the storage device when a prescribed length of time has elapsed since time indicated by the time and date recorded with the history data.

13. A user terminal comprising:
a communication unit that is connected to a printer via a network and that is configured to perform bi-directional communications with the printer via the network;
an inputting unit that receives user operations;
a displaying unit that displays data;
a processor; and
memory storing computer executable instructions that, when executed, cause the processor to function as:
a parameter setting unit that sets, according to input operations received via the inputting unit, a mark configuration parameter indicating configuration of a mark desired to be added to an image desired to be printed by target print data;
a data transmitting unit that transmits a combination of the mark configuration parameter and corresponding identification data of a user that has set the mark configuration parameter to the printer via the network, to allow the printer to store the combination of the mark configuration parameter and identification data, the data transmitting unit transmitting the target print data to the printer via the network when a printing command is received via the inputting unit; and
a user data display controlling unit that displays on the displaying unit a mark list based on data of the mark list that has been stored in the printer and that has been received from the printer via the network, the mark list listing at least one combination of the mark configuration parameter and the corresponding identification data, each combination including a mark configuration parameter indicating configuration of a mark and corresponding identification data identifying a user that has set the mark.

14. The user terminal according to claim 13, further comprising a transmission requesting unit that issues a request to the printer for the transmission of the data of the mark list when a command for acquiring the mark list is received via the inputting unit.

15. The user terminal according to claim 13, further comprising a transmission requesting unit that issues a request to the printer for the transmission of the data of the mark list when a printing operation is received by the inputting unit.

16. The user terminal according to claim 13, wherein the memory stores computer executable instructions that, when executed, cause the processor to further function as:
a determining unit that determines, for a target mark set by a target user, whether the mark list includes a combination of identification data and a mark configuration parameter, whose identification data identifies a user other than the target user but whose mark configuration parameter is the same as or similar to a mark configuration parameter for the target mark; and
an alerting unit that issues an alert via the displaying unit when the determining unit determines that the mark list includes a combination of identification data and a mark configuration parameter, whose identification data identifies a user other than the target user but whose mark configuration parameter is the same as or similar to the mark configuration parameter for the target mark.

17. A non-transitory computer readable medium storing a set of program instructions executable on a data processing device, the data processing device being connected to at least one user terminal via a network and being configured to perform bi-directional communications with the at least one user terminal via the network, the data processing device including a print controlling unit that prints an image on a recording sheet based on target print data that has been received from a user terminal, and that prints on the same recording sheet a mark set by the user terminal, from which the target print data has been received, according to a mark configuration parameter indicating configuration of the mark, the instructions causing the data processing device to perform steps of:
registering in a storage device provided in the data processing device a combination of a mark configuration parameter and corresponding identification data that is received from one of the at least one user terminal, the mark configuration parameter indicating configuration of a mark that has been set at the one of the at least one user terminal, the identification data identifying one user that has set the mark; and
transmitting to each user terminal data of a mark list that lists at least one combination of the mark configuration parameter and the corresponding identification data that has been stored in the storage device.

18. The non-transitory computer readable medium according to claim 17, wherein the data of the mark list is transmitted to one user terminal, from which a transmission request has been received, when the transmission request for the data of the mark list is received from the user terminal via the network.

19. The non-transitory computer readable medium according to claim 17, wherein, each time the print controlling unit prints an image and a mark based on the target print data and the mark configuration parameter, a combination of the mark configuration parameter and identification data for the user that has set the mark is recorded, as history data, in the storage device together with data for the date and time when the print controlling unit prints the image and the mark; and
wherein the instructions further cause the data processing device to perform a step of deleting history data from the storage device when a prescribed length of time has elapsed since time indicated by the time and date recorded with the history data.

20. A non-transitory computer readable medium storing a set of program instructions executable on a data processing device provided on a user terminal, the user terminal being connected to a printer via a network and being configured to perform bi-directional communications with the printer via the network, the data processing device having an inputting unit that receives user operations and a displaying unit that displays data, the instructions causing the data processing device to perform steps of:
setting, according to input operations received via the inputting unit, a mark configuration parameter indicating configuration of a mark desired to be added to an image desired to be printed by target print data;

transmitting a combination of the mark configuration parameter and corresponding identification data of a user that has set the mark configuration parameter to the printer via the network, to allow the printer to store the combination of the mark configuration parameter and corresponding identification data therein;

transmitting the target print data to the printer via the network when a printing command is received via the inputting unit; and controlling the displaying unit to display a mark list based on data of the mark list that has been stored in the printer and that has been received from the printer via the network, the mark list listing at least one combination of the mark configuration parameter and the corresponding identification data, each combination including a mark configuration parameter indicating configuration of a mark and corresponding identification data identifying a user that has set the mark.

21. The non-transitory computer readable medium according to claim 20, wherein the instructions further cause the data processing device to perform a step of issuing a request to the printer for the transmission of the data of the mark list when a command for acquiring the mark list is received via the inputting unit.

22. The non-transitory computer readable medium according to claim 20, wherein the instructions further cause the data processing device to perform a step of issuing a request to the printer for the transmission of the data of the mark list when a printing operation is received by the inputting unit.

23. The non-transitory computer readable medium according to claim 20, wherein the instructions further cause the data processing device to perform steps of:

determining, for a target mark set by a target user, whether the mark list includes a combination of identification data and a mark configuration parameter, whose identification data identifies a user other than the target user but whose mark configuration parameter is the same as or similar to a mark configuration parameter for the target mark; and issuing an alert via the displaying unit when the mark list includes a combination of identification data and a mark configuration parameter, whose identification data identifies a user other than the target user but whose mark configuration parameter is the same as or similar to the mark configuration parameter for the target mark.

* * * * *